United States Patent [19]
Beck et al.

[11] Patent Number: 5,913,911
[45] Date of Patent: Jun. 22, 1999

[54] METHOD AND APPARATUS FOR CONCENTRATING SIGNALS

[75] Inventors: Karl Allen Beck, Fruitport; Kimberly Scott, Grand Rapids, both of Mich.

[73] Assignee: Kuhlman Corporation, Spring Lake, Mich.

[21] Appl. No.: 08/795,527

[22] Filed: Feb. 14, 1997

[51] Int. Cl.[6] ................................................ G06F 7/70
[52] U.S. Cl. ............................ 701/1; 701/102; 701/29; 340/825.44
[58] Field of Search .................... 340/425.5, 439, 340/576, 466, 407.1, 441, 825.44; 342/42, 52, 70, 196; 701/1, 2, 102, 29

[56] References Cited

U.S. PATENT DOCUMENTS

| | | | |
|---|---|---|---|
| 3,126,738 | 3/1964 | Taylor | 73/182 |
| 3,217,535 | 11/1965 | Taylor et al. | 73/182 |
| 3,824,469 | 7/1974 | Ristenbatt | 340/825.44 |
| 4,809,547 | 3/1989 | Warrow | 73/183 |
| 4,977,559 | 12/1990 | McCambridge | 701/102 |
| 5,302,956 | 4/1994 | Asbury et al. | 342/70 |
| 5,309,140 | 5/1994 | Everett, Jr. et al. | 340/466 |
| 5,432,497 | 7/1995 | Briski et al. | 340/525 |
| 5,438,880 | 8/1995 | Washburn | 73/861.5 |
| 5,445,347 | 8/1995 | Ng | 701/35 |
| 5,678,196 | 10/1997 | Doyle | 340/993 |

OTHER PUBLICATIONS

Joint SAE/TMC Electronic Data Interchange Between Microcomputer Systems in Heavy–Duty Vehicle Applications—SAE J1587 Nov. 1990.

"Serial Data Communictions Between Microcomputer Systems in Heavy Duty Vehicle Applications"—SAE J1709 Oct. 1990.

"Truck Gages Get On the Bus", Design News. Oct. 7, 1996. pp. 116–120.

Ametek/Dixson Instrumentation Catalog. pp. 14–15.

*Primary Examiner*—Jacques H. Louis-Jacques
*Attorney, Agent, or Firm*—Dykema Gossett PLLC

[57] ABSTRACT

A method and apparatus for concentrating diverse input signals indicative of the state or magnitude of a variety of functions and conditions of an engine-driven watercraft is disclosed. A power regulation portion includes a feedback resistor configured to form a hysteresis loop to prevent operation in a linear region when an over voltage condition exists, thus protecting the circuitry from excessive power dissipation. The apparatus also includes a reverse voltage protection circuit including a diode and a polyswitch that protects downstream circuits from application of reverse polarity power. An inventive method for determining the speed of the watercraft, using a measured pressure, and which includes a calculated component designed to account for the effects of the friction as in a pitot tube is disclosed. An input is obtained from a user-actuated switch, such input being used to vary an adjustment factor, which in turn varies the watercraft speed determination using the inventive speed method. A method of determining a rotational speed of a rotating component of an engine in the engine-driven watercraft is also disclosed. The speed determining method includes the steps of defining a sampling time, counting the number of pulses of a tachometer signal having pulses for the sampling time, and determining an average time interval per pulse. The average time interval per pulse parameter is then used to calculate a rotational speed of the engine.

20 Claims, 17 Drawing Sheets

FIG.6A
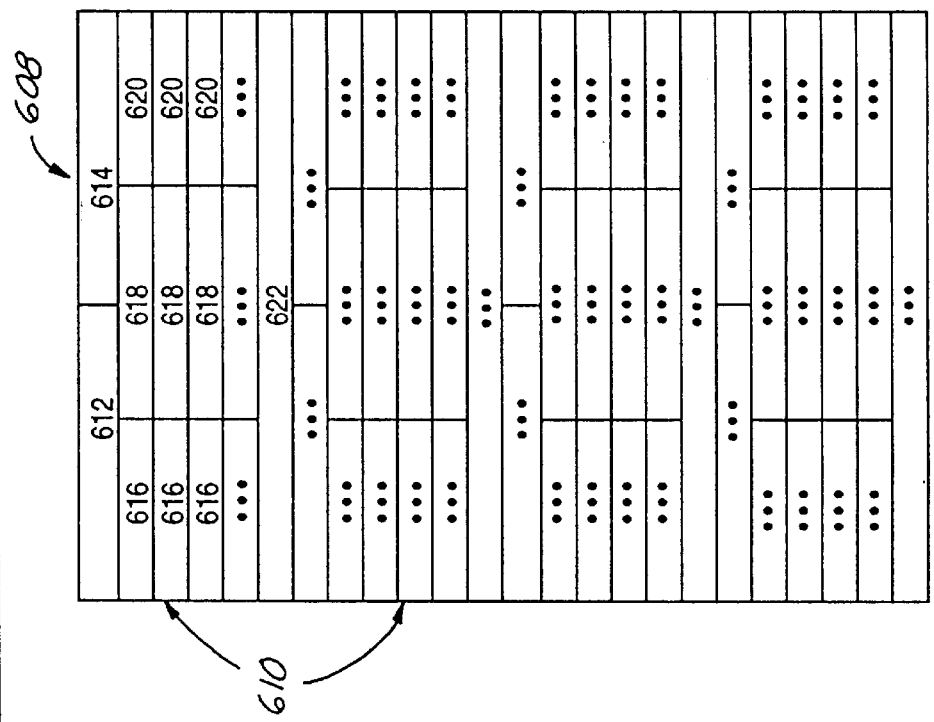
FIG.6C
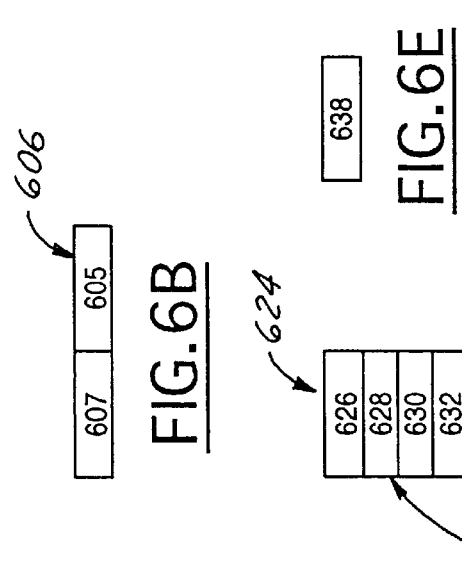
FIG.6B
FIG.6E
FIG.6D

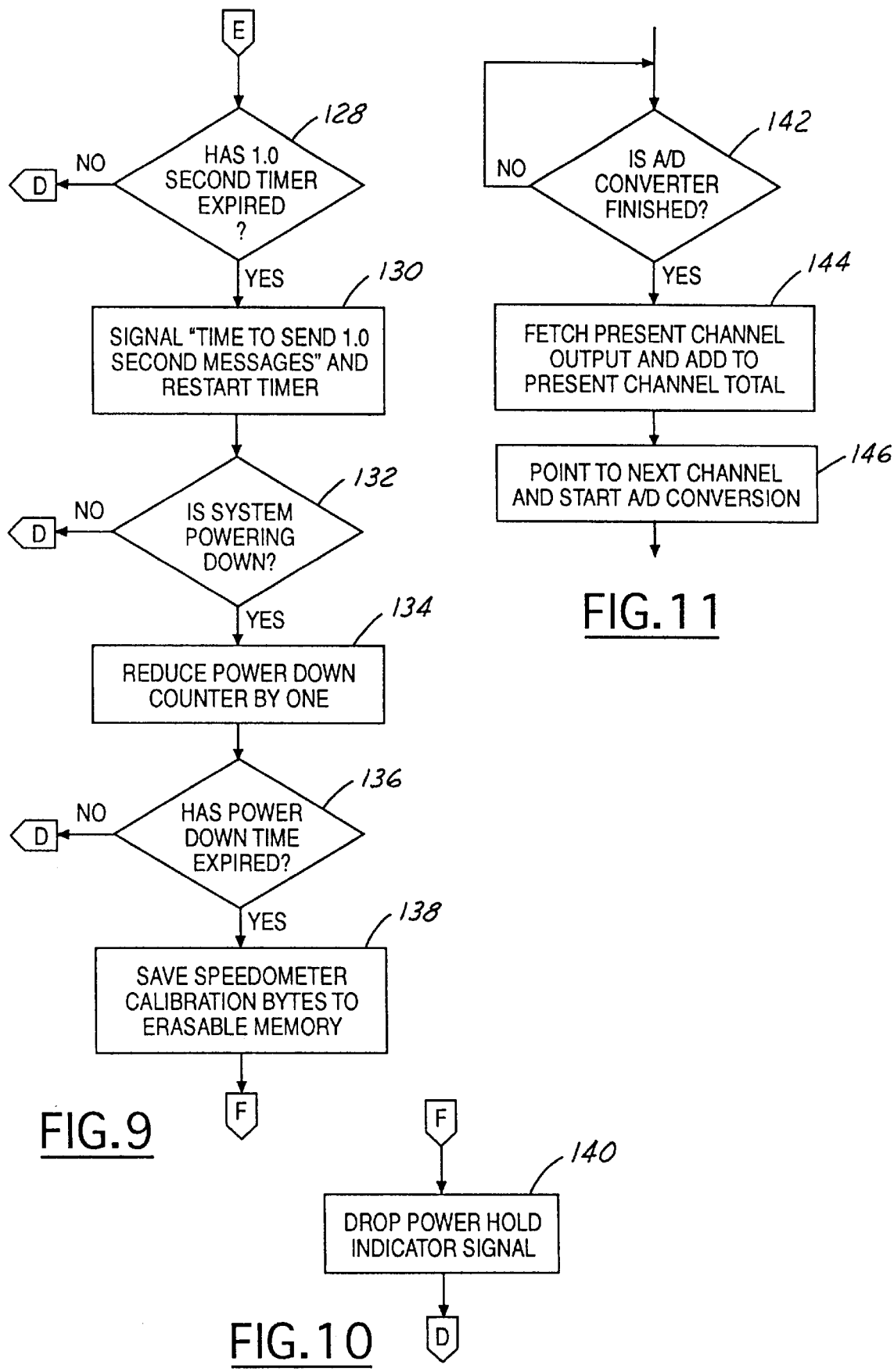

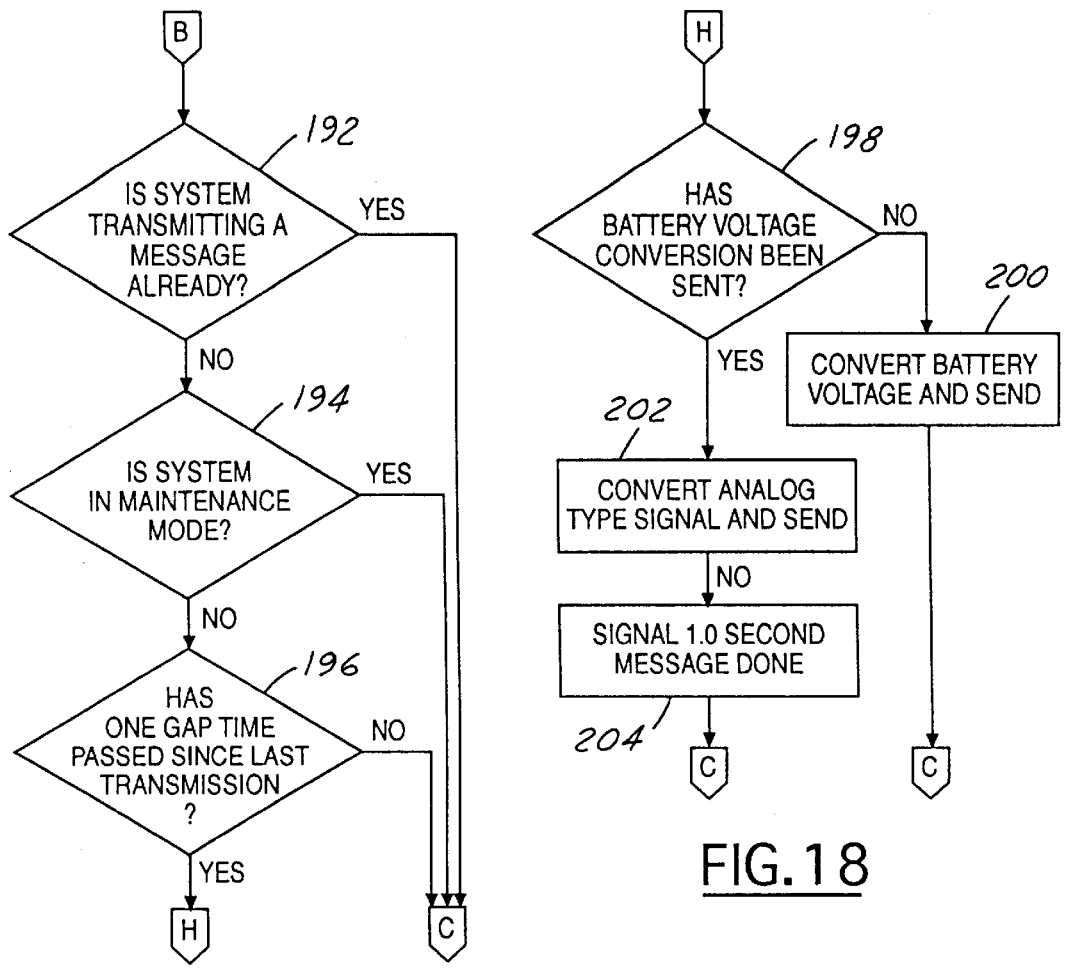
FIG.17
FIG.18
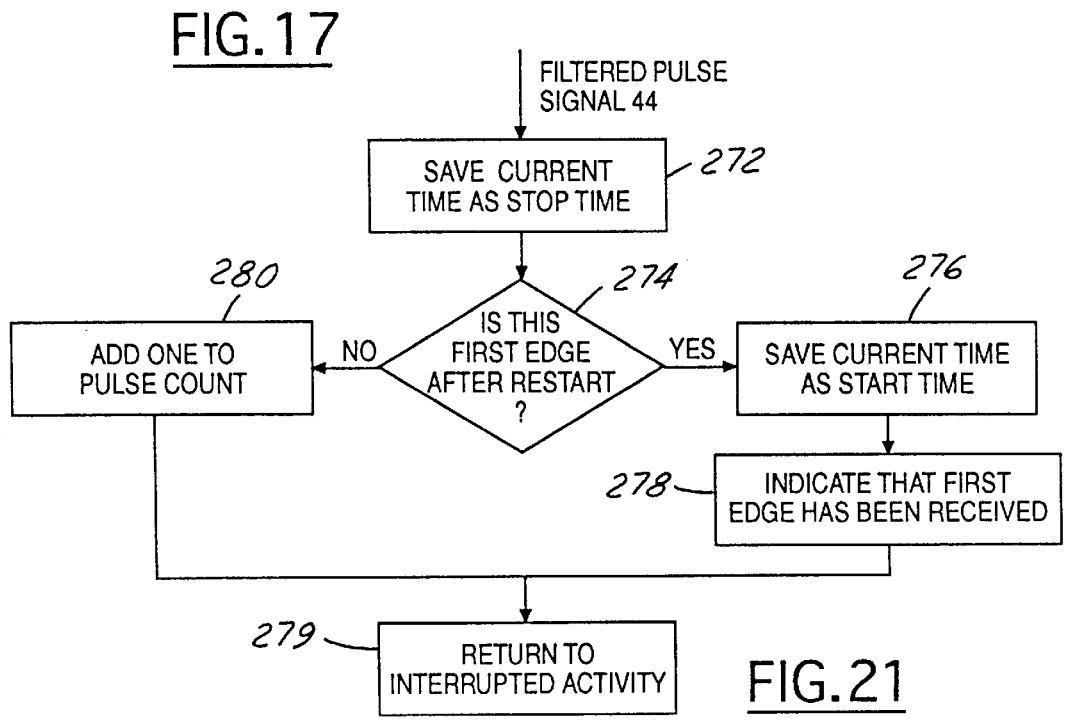
FIG.21

METHOD AND APPARATUS FOR CONCENTRATING SIGNALS

FIELD OF THE INVENTION

The present invention relates to a method and apparatus for concentrating electrical signals, and more particularly, to concentrating one or more digital or analog signals into a single digital data stream in an engine-driven vehicle.

BACKGROUND OF THE INVENTION

Since the advent of motorized vehicles it has been desirable to measure and display various characteristics of vehicle performance and operation. While there are many different types of engine-driven vehicles, including automobiles, trucks, aircraft, and boats, the nature of the parameters to be measured and displayed is fundamentally similar, and many are common to all of the aforementioned applications, such as, for example, vehicle speed, engine speed, engine oil pressure, coolant temperature, battery voltage, and remaining fuel.

The mechanism for measuring and displaying these and other parameters generally includes a sender and a gauge attached thereto. The sender measures the specific parameter of interest and converts that quantity into an electrical signal. The gauge receives the electrical signal generated by the sender and converts it into some form of human-readable display, such as, for example, a pointer movement across a printed dial face.

Historically, these systems have enjoyed very widespread use and acceptance. Most engine-driven vehicles have at least one such sender and gauge pair, and many, such as large boats, have upwards of seven. However, despite their popularity, traditional sender and gauge systems present certain inherent drawbacks, especially when utilized in a large vehicle. Senders are typically located on or near the engine, while gauges are usually located near the vehicle operator. Such an arrangement may be adequate for smaller vehicles like automobiles, but trucks, aircraft, yachts, and other large vehicles often distance the operator from the engine. Thus the wires between the senders and their respective gauges must extend for long distances throughout the body of the vehicle. Furthermore, the arrangement of one wire for each sender and gauge pair means that a substantial number of wires must extend across the vehicle, which takes up space and adds weight. Also, sender signals typically present information via varying voltages, currents, resistances, or even by means of digitally encoded information. When wires carrying a variety of signals are bundled together across significant distances, there is a potential for crosstalk between adjacent wires, and reliability can decrease proportionately as the quantity of wire in the vehicle increases.

Aside from the physical hardships, there are additional electrical issues regarding gauge responsiveness in the traditional sender and gauge pair system. Since each pair is separate from the other pairs, it is impossible to coordinate between related gauges, such as, for example, running an hourmeter only when the tachometer indicates that the engine is operating above some minimal RPM level. Furthermore, each gauge must be specifically configured to interpret the signal received from the sender, such that it is incapable of being used with a sender of a different scale. For example, traditional fuel senders include, among others, senders which run linearly from 0 to 90 ohms across an Empty to Full range, as well as senders which run linearly from 240 to 33 ohms across the same range. A conventional fuel gauge associates specific ohm readings from the sender, such as, for example, 45 ohms, with specific fuel quantities. Consequently, a gauge which is designed to operate with the 0 to 90 ohm sender will give inaccurate readings when used with a 240 to 33 ohm sender. This characteristic applies to all traditional sender and gauge pairs, resulting in inconvenience, expense, and even re-work when gauges and senders are not properly matched.

It would thus be desirable to have a means for concentrating one or more analog or digital sender signals into a single, reliable digital data signal. The present invention is directed at achieving these objectives.

SUMMARY OF THE INVENTION

In one aspect of the present invention, an integrated apparatus for generating a digital data stream is provided. One advantage of the apparatus according to this aspect of the present invention is that it provides an efficient means for collecting a plurality of diverse signals indicative of various functions and conditions of an engine-driven vehicle. The apparatus comprises three main portions, namely, sensing means, converting means, and transmitting means. The sensing means is provided for sensing a plurality of vehicle function and condition indicative signals, and generating in response thereto corresponding digital equivalent signals. In particular, at least one of the vehicle function and condition indicative signals is mechanical in nature and a second one of the vehicle function and condition signals is electrical in nature. The converting means is provided for converting the digital equivalent signals into a plurality of corresponding digital messages. Finally, the transmitting means is provided for transmitting the plurality of digital messages on a data bus extending through the vehicle.

In a preferred embodiment, the engine-driven vehicle is a marine vehicle, wherein the function and condition indicative signals comprise a pressure whose magnitude corresponds to the speed of the marine vehicle, a digital signal having pulses corresponding to the speed of the engine driving the vehicle, and an analog signal corresponding, for example, to the battery voltage level associated with the marine vehicle.

In a second aspect of the present invention, an apparatus for regulating an input voltage on an input node to a predetermined output voltage on a output node is provided which has an over voltage triggered protection circuit. The regulating apparatus has five major portions, namely, an input transistor, a regulator device, a zener diode, a feedback resistive network, and a disable circuit. During normal operation, the feedback resistive network provides a predetermined voltage level to the anode of the zener diode. The zener diode has a predetermined reverse breakdown threshold level associated therewith. When the input voltage exceeds the sum of the zener reverse breakdown threshold voltage, and the predetermined feedback voltage, the zener diode will conduct, thus causing the regulating apparatus to become disabled by way of the disable circuit. The feedback voltage provided to the anode of the zener diode decreases substantially to zero when the regulating apparatus is disabled. Once the regulating apparatus has been disabled, the input voltage must fall below the zener diode reverse breakdown threshold level to again enable operation of the regulating apparatus. One advantage of an embodiment according to this aspect of the present invention is that the hysteresis loop established by the feedback resistive network prevents the zener diode from merely regulating the input voltage to a level where the regulating apparatus will operate. This would be an undesirable condition inasmuch as components, such as the input transistor, would then operate in a linear region, and would thus be required to dissipate undesirably large amounts of power.

In a third aspect of the present invention, a reverse voltage protection circuit is provided. One advantage of a reverse voltage protection circuit according to this aspect of the present invention is that it allows, during normal operation, the input voltage to be passed transparently therethrough without significant attenuation or distortion. This feature permits downstream circuitry to have use of the full swing of the input voltage, and/or permit measurement circuitry provided for measuring the magnitude of the input voltage to make more accurate determinations than with conventional reverse voltage protection circuits. The inventive protection circuit includes a diode, and a polyswitch. The diode has an anode connected to a ground node, and a cathode connected to an input node of the circuit to be protected. The polyswitch includes a first terminal connected to a power source, and a second terminal connected to the input node. The polyswitch provides an electrically conductive path for electric current below a predetermined threshold. During normal operation, the polyswitch passes electrical current to the input node without significant attenuation or distortion. However, when the power source is connected so as to have a negative polarity, current from the ground node is sunk through the diode and the polyswitch to the power source until the threshold is reached. The polyswitch opens at the threshold to thereby protect the device.

In a fourth aspect of the present invention, a method of determining a speed of a marine vehicle is provided, and includes four basic steps. The first step involves measuring a pressure derived from velocity-to-pressure means associated with the marine vehicle. This means may be a pilot tube. The second steps involves determining a first speed component using the measured pressure in accordance with a square root function. The third step involves determining a second speed component using the measured pressure in accordance with a linear function. Finally, the fourth step involves calculating a vehicle speed as a linear function of the first speed component and the second speed component. One advantage of this aspect of the present invention is that the second speed component compensates or accounts for the effects of friction in the pilot tube, which become more significant at lower vehicle speeds (i.e., lower pressures).

In a preferred embodiment of this aspect of the present invention, an input device is provided in the form of a two position rocker-style switch, which also has a repose position. This switch allows a user of the marine vehicle to adjust or calibrate the numerical output of the speed determination. The advantage of this switch is that changes in water density, especially as related to salinity, may be compensated for to thereby provide more accurate speed determinations. More specifically, the switch is a rocker switch with a return-to-repose position bias. During operation, the user may move the switch to the first position, which is operative to increase an adjustment factor that is used in determination the first speed component. Likewise, when a user moves the switch to a second position during operation, a decrease in the adjustment factor is obtained. In the repose position, the adjustment factor is maintained at a pre-existing value. One advantage of the preferred, switch embodiment, is that while the marine vehicle is off, adjustments to the switch have no effect on the calibrated adjustment factor (and thus no effect on the numerical speed output).

In a fifth aspect of this invention, a method for determining a rotational speed of a rotating component of an engine-driven vehicle is provided. There are five basic steps. The first step involves generating a signal having pulses corresponding to the rotation of the rotating component. The second step involves selecting a sampling time interval. Third, counting the number of pulses generated in the first step during the sampling time interval selected in the second step. The fourth step involves determining an average time interval per pulse using the number of counted pulses and the sampling time interval. Finally, the fifth step involves calculating the rotational speed of the rotating component of the engine over the sampling time interval using the average time interval per pulse.

An embodiment according to this aspect of the present invention provides for faster response than that available through the use of conventional methods and apparatus, which may use, for example, a simple integrator circuit.

Other objects, features, and advantages of the present invention will become apparent to one skilled in the art from the following detailed description and accompanying drawings illustrating features of this invention by way of example, but not by way of limitation.

BRIEF DESCRIPTION OF THE DRAWINGS

FIGS. 6A–6E is a simplified, schematic diagram of a preferred embodiment of data structures stored in an erasable memory.

FIG. 9 is a second continuation of the flow chart of FIG. 7.

FIG. 10 is a third continuation of the flow chart of FIG. 7.

FIG. 11 is a flow chart illustrating the control involved in servicing analog-to-digital converter 20 in a data concentrating apparatus.

FIG. 17 is a flow chart showing preparation for conversion and transmission of 1.0 second messages in a data concentrating apparatus.

FIG. 18 is a first continuation sheet of the flow chart of FIG. 17.

FIG. 21 is a flow chart of the pulse signal processing for a data concentrating apparatus.

DETAILED DESCRIPTION OF THE PREFERRED EMBODIMENTS

Figure 1:
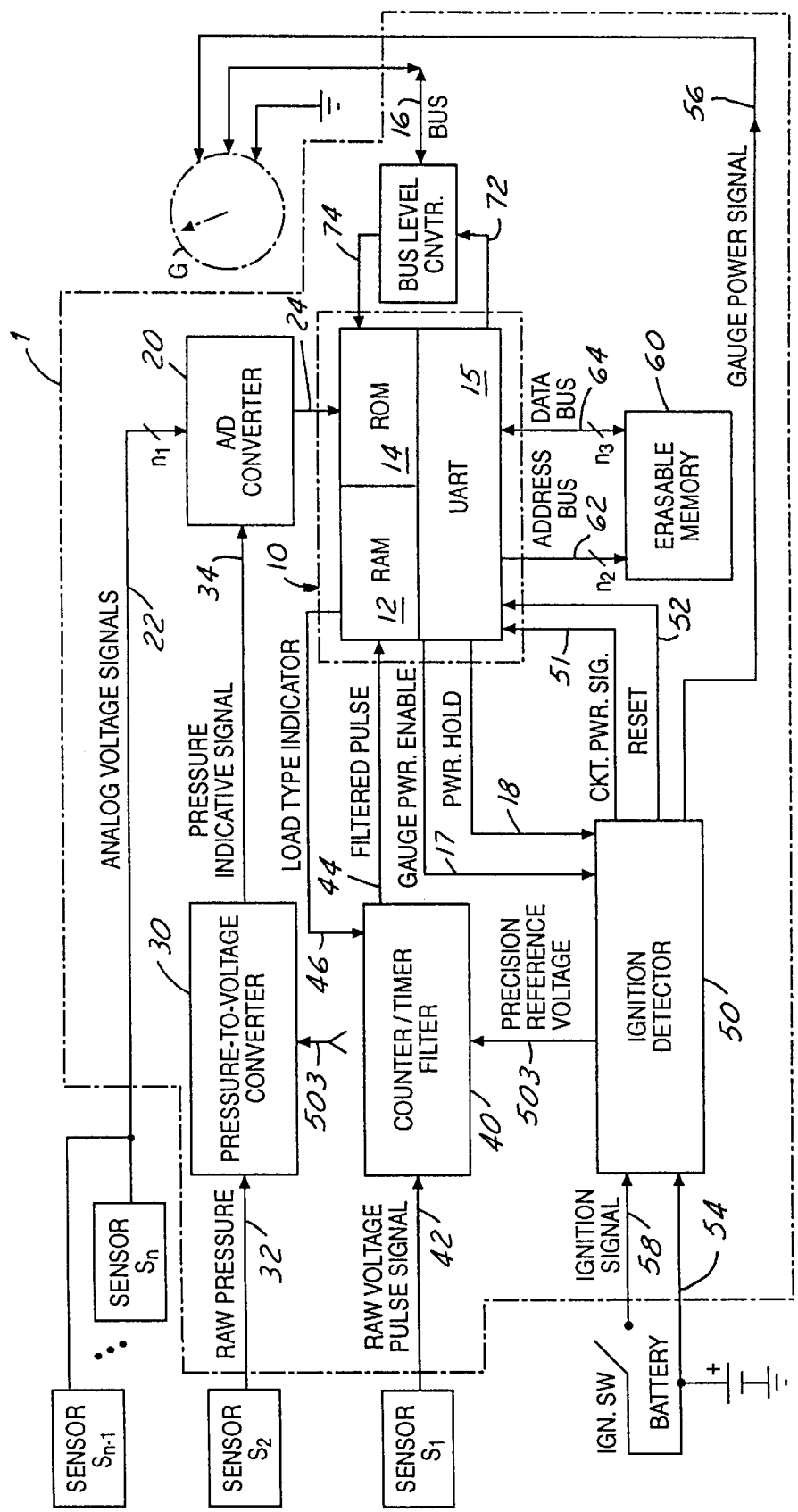
FIG. 1 is a simplified schematic and block diagram of a preferred embodiment of a data concentrating apparatus.

Before proceeding to a detailed description of the several aspects of the present invention, the control established by the present invention, as well as the preferred environment will be set forth in detail. FIG. 1 shows a data concentrating apparatus 1, adapted for receiving one or more signals selected from the group consisting of digital signals, analog signals, and physical parameters, such as pressure. Generally, these signals correspond to a plurality of vehicle functions and conditions of an engine-driven vehicle. Data concentrating apparatus 1 converts, scales, or otherwise processes the information contained in these "signals", and develops a corresponding digital message, and, at predetermined intervals, transmits these messages over a, in the preferred embodiment, single-wire bus. The single-wire bus is coupled to one or more display gauges provided for displaying, in a manner susceptible to being directly perceived by an operator or passenger of the vehicle.

It should be appreciated that disclosure of the present invention is in such detail as to enable one of ordinary skill in the art to make and use the invention. Accordingly, the description is exemplary, rather than limiting in nature. Moreover, to clearly describe how to make an embodiment of the present invention, where applicable, part numbers for commercially available parts are set forth. Unless described to the contrary, all diodes are commercially available components from, for example, Diodes Incorporated, all resistors are commercially available components available, from for example, SEI, and all capacitors are commercially available components available, from, for example, Sprague.

In addition, while embodiments of the present invention are suitably adapted for use in any engine-driven vehicle, a preferred embodiment of the invention finds application in a marine setting, specifically, in an engine-driven watercraft.

Now referring to FIG. 1, a preferred embodiment of a data concentrating apparatus 1 includes a pressure-to-voltage converter 30 which receives on an input a raw pressure signal 32 and converts raw pressure signal 32 into a pressure indicative voltage signal 34 which is generated on an output, and which is proportionately representative of said raw pressure signal 32. Data concentrating apparatus 1 also includes an analog-to-digital converter 20, which is known to those skilled in the art and could be, for example, a TLC1543. A/D 20 is a commercially available component from, for example, Texas Instruments. Analog-to-digital converter 20 receives one or more analog voltage signals 22 or pressure voltage 34 and converts said voltages into one or more digital voltage equivalents 24, with each digital voltage equivalent 24 corresponding to one analog voltage signal 22 or pressure voltage 34. Signals 22 may be derived from one or more parameter sensors $S_{n-1}$, $S_n$ is or may be taken from other nodes in apparatus 1. Note that while the TLC1543 given as an example is a serial analog-to-digital converter with eleven channels which converts analog inputs to a serial digital output one channel at a time, a parallel analog-to-digital converter could also be used. Also, the number of channels could be greater or less, depending on the requirements of the application.

Continuing with FIG. 1, data concentrating apparatus 1 further includes a counter/timer filter 40 which receives a raw voltage pulse signal 42 on an input terminal, from a sensor, which is indicative of a speed of an engine of the engine-driven vehicle in which apparatus 1 is resident. The sensor may take the form of, for example, an ignition coil of the engine. Alternatively, the pulse signal 42 may de derived from Hall effect sensors, disposed in proximity to the engine shaft to detect rotation of the shaft. Counter/timer filter 40 also receives a load type indicator 46 from a control means, such as a microcontroller 10, which assists (more detail of which will appear hereinafter) counter/timer filter 40 in converting raw voltage pulse signal 42 into a filtered pulse signal 44, which is preferably a square waveform with a minimum of electrical noise and voltage levels within a range acceptable to microcontroller 10. The filtered signal has pulses of a frequency corresponding to the engine speed.

There, the sensors, circuit 30, and circuit 40, cooperate to provide a means for sensing a plurality of vehicle function and condition indicative signals and generating a plurality of corresponding digital equivalent signals. Obviously, signal 42 is already somewhat digital in nature; however, signal 44 shall be considered a digital equivalent for this invention.

Microcontroller 10, which may be, for example, an 89C2051, a commercially available component from Atmel, and which preferably includes data memory 12, such as random-access memory (RAM), for storing temporary variables, program memory 14, or read-only memory (ROM), for storing a fixed program, and a Universal Asynchronous Receiver Transmitter (UART) 15 for transmitting and receiving serial data. Microcontroller 10 provides the means for converting the plurality of digital equivalent signals referred to above into a plurality of corresponding digital messages (e.g., identifier, payload data, etc.) For example, microcontroller 10 measures the time between pulses of filtered pulse signal 44 and translates this time into a digital value, such as, for example, Rotations Per Minute. Microcontroller 10 also receives one or more digital voltage equivalents 24 from A/D 20 as well and translates these into digital values, such as, for example, Pounds Per Square Inch or Degrees Fahrenheit. These digital values are included in formatted digital messages to be sent on bus 16.

Continuing with FIG. 1, microcontroller 10 combines one or more digital values into a transmitter output stream 72 (i.e., a digital data stream) in the formal "messages" which microcontroller 10 sends to a bus level converter 70 by means of UART 15. Bus level converter 70 converts the voltage levels of transmitter output stream 72 into those of a single wire data signal 16. Converter 70 thus forms a means for transmitting a plurality of digital messages on bus 16. Single wire data signal 16 may then be received by one or more gauges indicated at G in the Figures for subsequent interpretation and display. Note that in a preferred embodiment, the voltage levels of transmitter output stream 72 are active high, five volt pull down as generated by microcontroller 10, and the voltage levels of single wire data signal 16 are preferably of the open drain type of drive, in order to generate sufficient current to drive multiple gauges while still permitting other devices to similarly transmit single wire data signals 16, such as, for example, a diagnostic device (not shown). Bus level converter 70 also converts the voltage levels of single wire data signal 16 into those of a receiver input stream 74, which are active high, five volt pull down levels similar to those of transmitter output stream 72. This permits microcontroller 10 to monitor its own transmissions, as well as acknowledge those of any other transmitting device on the bus, such as, for example, a diagnostic device (not shown).

To perform said translations, microcontroller 10 preferably utilizes an erasable memory 60. Erasable memory 60, which may be, for example, a 24C08, a commercially available component from Atmel, contains one or more conversion numbers (not shown), each with its own unique address. Microcontroller 10 requests information from erasable memory 60 by supplying a specific memory address 62 (illustrated as $N_2$ lines bus). Erasable memory 60 in turn supplies a memory content 64 stored at specific memory address 62.

Data concentrating apparatus 1 also preferably includes an ignition detector 50 which receives a battery voltage signal 54 and an ignition signal 58 from the vehicle (not shown) within which data concentrating apparatus 1 is resident. Upon detection of ignition signal 58 (i.e., upon closure of switch IGN. SW. by an operator of the vehicle while battery voltage signal 54 is also present, ignition detector 50 supplies microcontroller 10 with a circuit power signal 51 and a microcontroller reset signal 52 which causes microcontroller 10 to operate. Ignition detector 50 also preferably supplies power to one or more gauges (one illustrated in phantom-line by means of a gauge power signal 56, and supplies a precision voltage 503 to counter/timer filter 40 and also to pressure-to-voltage converter 30.

Microcontroller 10 preferably monitors circuit voltage as one of digital voltage equivalents 24 such that when circuit voltage is less than a specific value, microcontroller 10, by means of a power hold indicator signal 18, directs ignition detector 50 to turn off circuit power signal 51. Microcontroller 10 also controls the flow of power to the gauges by means of a gauge power enable 17, which ignition detector 50 receives and uses to disable or enable gauge power signal 56, thereby conserving power.

Figure 2A:
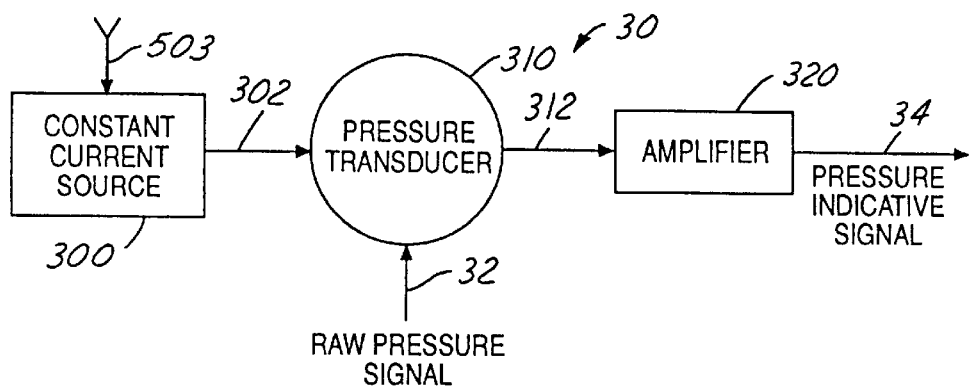
FIG. 2A is a simplified block diagram of a preferred embodiment of a pressure to voltage converter.

Turning now to FIG. 2A, a preferred embodiment of pressure-to-voltage converter 30 receives precision voltage 503 from ignition detector 50 which is supplied to a constant current source 300 which is known to those skilled in the art and may implemented using, for example, a commercially available component, part no. LMC 660A from National Semiconductor. Constant current source 300 utilizes precision voltage 503 to generate a constant current 302 for providing temperature compensation to a pressure transducer 310. Pressure transducer 310, such as, for example, an MPX200, a commercially available component from Motorola, receives raw pressure signal 32, such as might be generated by, for example, a Pitot tube (not shown), and converts raw pressure signal 32 into a small swing voltage 312. Although, in the preferred watercraft environment, preferably, a conventionally device to convert waterspeed to pressure is used to develop pressure 32, most preferably a venturi-type apparatus, such as disclosed and claimed on copending U.S. patent application Ser. No.: 08/728,573, entitled, Venturi Type Speed Measuring Device, is used to develop pressure 32. As will be understood from the description to appear hereinafter, pressure is indicative of the speed of the fluid (e.g. water) through the pressure generating device.

Small swing voltage 312 is amplified by a low drift amplifier 320, which is known to those skilled in the art and may be implemented using, for example, a commercially available component, part no. LMC 660A (National Semiconductor), to generate pressure voltage 34, which is proportionately representative of said raw pressure signal 32. Those skilled in the art will recognize that while a preferred embodiment uses amplifier 320 to proportionately increase small swing voltage 312 such that it is of an order of magnitude similar to that of analog voltage signal 22 in FIG. 1, this function merely provides greater resolution and is not necessarily essential to the operation of the instant invention.

Figure 2B:
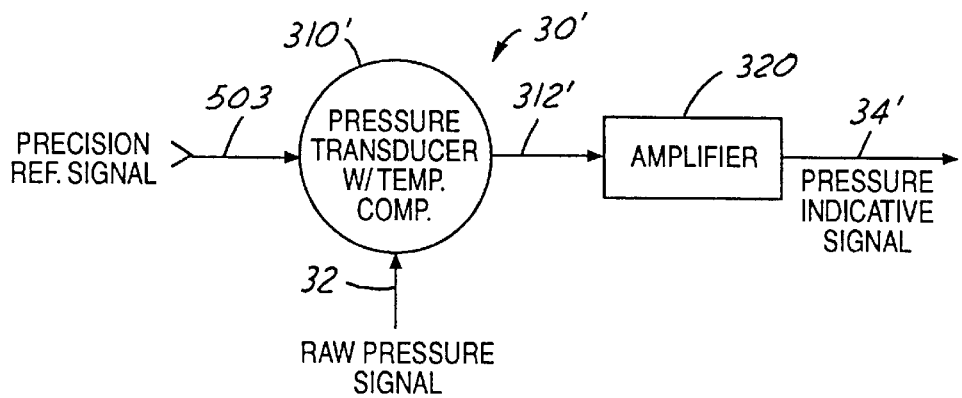
FIG. 2B is a simplified block diagram of an alternative embodiment of a pressure to voltage converter.

Now turning to FIG. 2B, an alternative embodiment of pressure-to-voltage converter 30' employs pressure transducer 310' with internal means for temperature compensation, such as, for example, an MPX2200, which is a commercially available component from Motorola. Ignition detector 50 (not shown in FIG. 2B) supplies precision voltage 503 directly to pressure transducer 310'. Pressure transducer 310' converts raw pressure signal 32 into small swing voltage 312', which is amplified by amplifier 320 into pressure voltage 34' (temperature compensated version of 34).

As indicated elsewhere, raw pressure signal 32 is a pressure provided from, for example, a pitot tube, which is brought to transducer 310' using a tube, and coupled to a fitting on transducer 310' adapted to receive the tube.

Figure 3A:
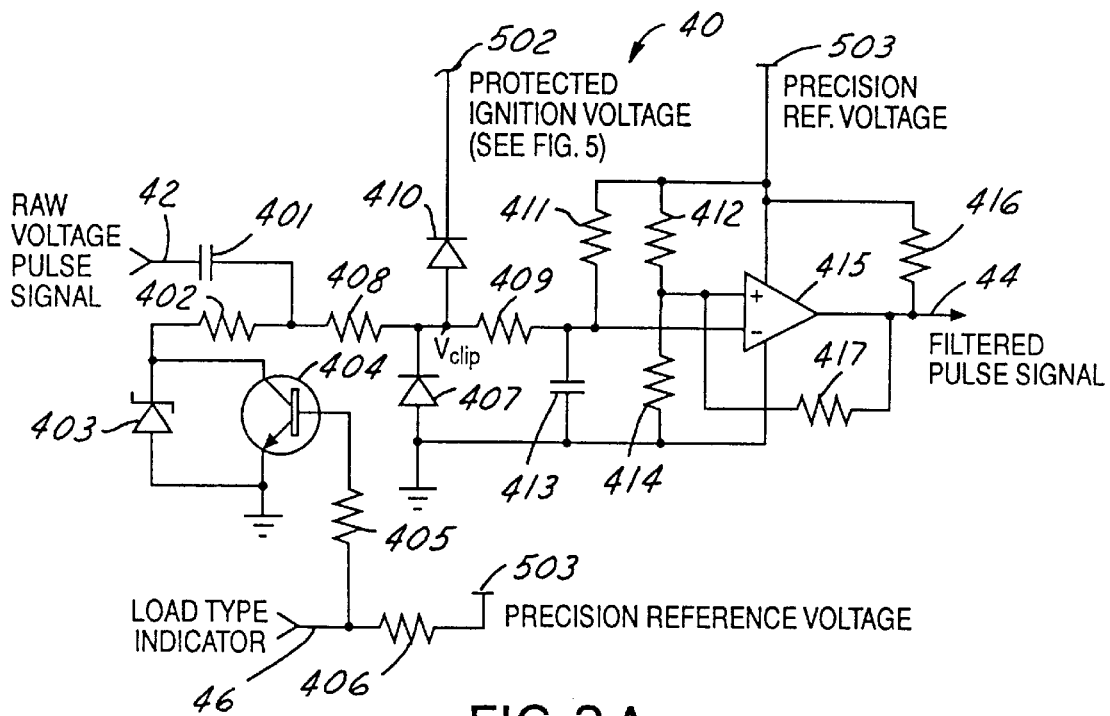
FIG. 3A is a simplified schematic diagram of a preferred embodiment of a counter/timer filter circuit.

Turning now to FIG. 3A, signal flow through a preferred embodiment of counter/timer filter 40 begins with raw voltage pulse signal 42 being routed through decoupling capacitor 401. A load is required to discharge decoupling capacitor 401. This load may possibly be built into whatever external device supplies raw voltage pulse signal 42, or it may need to be supplied by counter/timer filter 40, such as in the case of a non-zero crossing type of raw voltage pulse signal 42. Load type indicator 46 is used to alternatively select whether a load is needed, and to switch in a load. Load type indicator 46 is supplied by microcontroller 10, which reads a load configuration indicator 605 (shown in FIG. 6B) stored in erasable memory 60.

Continuing with FIG. 3A, load type indicator 46 is coupled to a load transistor 404, such as a 2N4401 (commercially available from Motorola), through a base resistor 405, which may have a value of, for example, 10 K Ohms. Load type indicator 46 is pulled up to precision voltage 503 through a first pull up resistor 406, which may have a value of, for example, 4.7 K Ohms. Load transistor 404 is coupled to one side of decoupling capacitor 401 through a first resistor 402, which may have a value of, for example, 4.7 K Ohms. Load transistor 404 is protected by means of a first Zener diode 403, such as, for example, a 1N4749.

A current limiting resistor 408, which may have a value of, for example, 5.1 K Ohms, is used to limit the current of the signal passing therethrough. The current limited signal is then "clipped", both in the positive and negative sense at node $v_{CLIP}$. That is the current limited signal is subsequently clipped by a negative clipping diode 407, such as a 1N4148, which is biased to ground and a positive clipping diode 410, such as a 1N4148, which is biased to a protected ignition voltage 502, which is described in connection with FIG. 5.

Continuing with FIG. 3A, the clipped signal is low pass filtered by an RC type filter to remove noise. The RC Filter includes a second resistor 409, which may have a value of, for example, 5.1 K Ohms, and a first capacitor 413, which may have a value of, for example, 0.1 microfarads. The filtered signal is then fed into an inverting terminal of a first operational amplifier (hereinafter "op amp") 415, such as an LM2903, which generates filtered pulse signal 44. Part LM2903 is commercially available from, for example, Motorola. First op amp 415 is configured as a comparator by means of a first positive threshold resistor 412, a second positive threshold resistor 414 and a feedback resistor 417 (connecting the op amp 415 output to its non-inverting input terminal). The values of first positive threshold resistor 412 and second positive threshold resistor 414 may be, for example, 100 K Ohms and 10 K Ohms, respectively, while the value of feedback resistor 417 may be, for example, 1 MOhm. A biasing resistor 411, which may have a value of, for example, 100 K Ohms, is used to prevent signal from becoming negative, while a second pull up resistor 416, which may have a value of, for example, 4.7 K Ohms, is used to pull up the open collector output of first op amp 415 to precision voltage 503.

Those skilled in the art will appreciate that the component values of counter/timer filter 40 are largely determined by the expected fundamental time and voltage characteristics of raw voltage pulse signal 42, and that substitutions and variations may therefore be desirable.

Figure 3B:
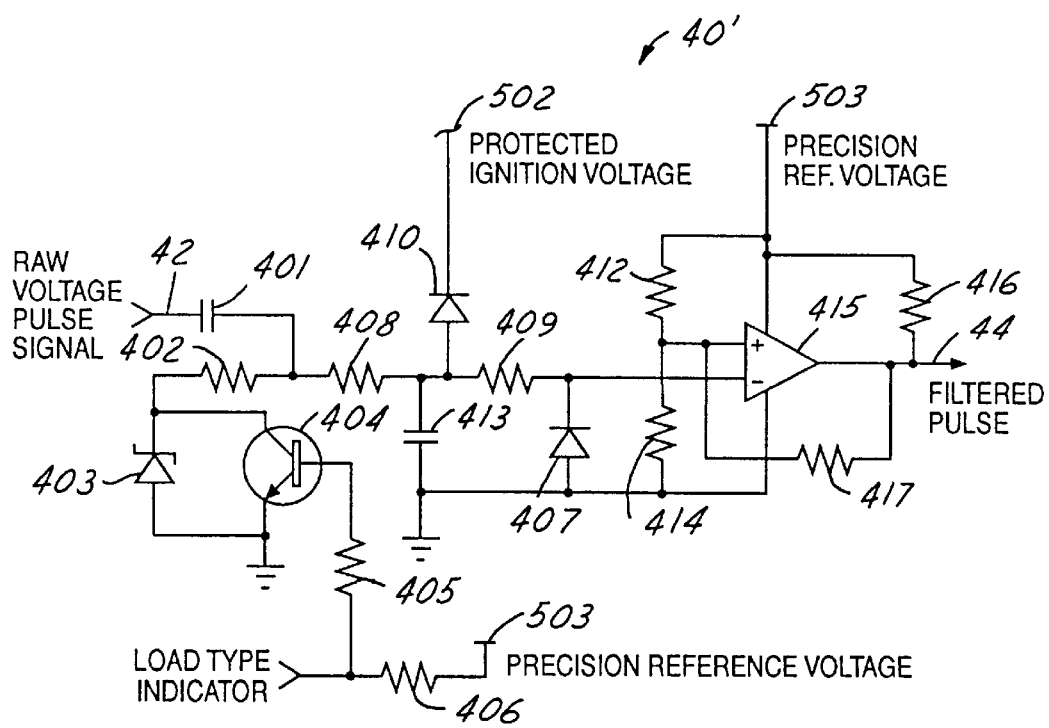
FIG. 3B is a simplified schematic diagram of an alternative embodiment of a counter/timer filter circuit.

FIG. 3B illustrates an alternative embodiment counter/timer filter 40'. This alternative embodiment is preferable when raw voltage pulse signal 42 has lower frequency noise such that first capacitor 413 must be enlarged to increase the filter time constant of the high pass filter created by first capacitor 413 and second resistor 409. Since the increase of first capacitor 413 may negatively affect the thresholds of first op amp 415 by increasing the threshold, it is preferable to positionally swap negative clipping diode 407 and first capacitor 413. In this alternative embodiment, biasing resistor 411 shown in FIG. 3A may be omitted. In this preferred embodiment, decoupling capacitor 401 is preferably 0.47 microfarads, first resistor 402 is preferably 10 K Ohms, current limiting resistor 408 is preferably 10 K Ohms, second resistor 409 is preferably 4.7 K Ohms, positive threshold resistor 414 is preferably 100 K Ohms, feedback resistor 417 is preferably 47 K Ohms, negative clipping diode 407 is preferably a Schottky 1N5819, and first capacitor 413 is preferably 0.22 microfarads. As discussed previously, those skilled in the art may vary component values to accommodate expected pulse waveforms without departing from the spirit and scope of the instant invention.

Figure 4:
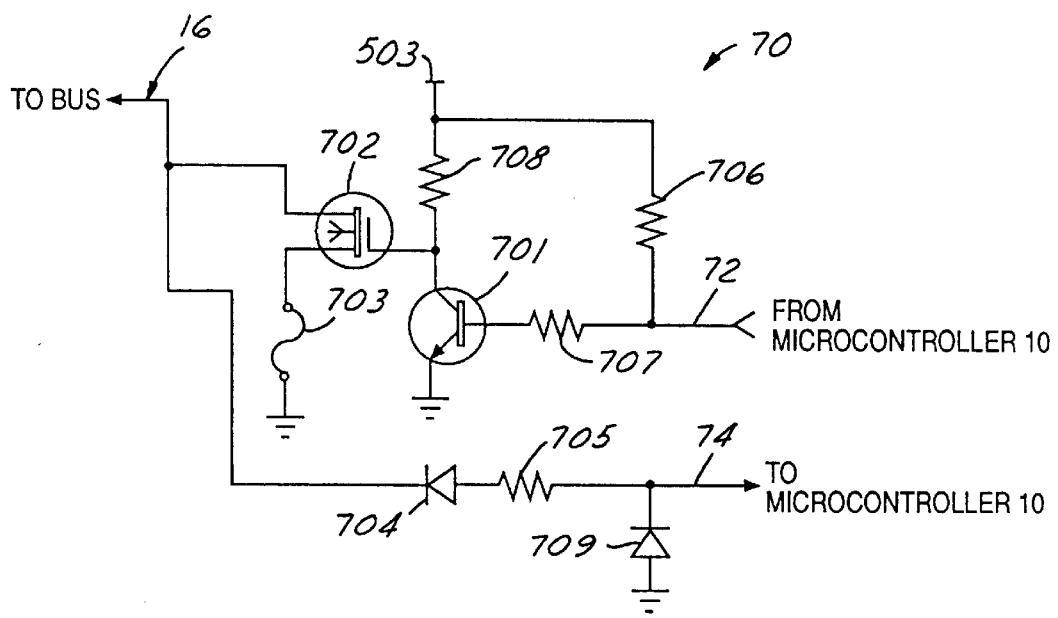
FIG. 4 is a simplified schematic diagram of a preferred embodiment of a bus level converter.

Turning now to FIG. 4, a preferred embodiment of a bus level converter 70 includes a first transistor 701, such as, for example, a 2N4401 (commercially available from, for example, Motorola), which is coupled to transmitter output stream 72 through a fifth resistor 707, which has a value of, for example, 47 K Ohms. First transistor 701 is configured as a saturated inverting transistor with a fourth resistor 706, which has a value of, for example, 4.7 K Ohms, and a sixth resistor 708, which has a value of, for example, 10 K Ohms, and is tied to precision voltage 503. First transistor 701 inverts the polarity of transmitter output stream 72. Collector of first transistor 701 is coupled to a first field effect transistor 702, such as, for example, an MPF 3055 (commercially available from, for example, Harris Semiconductor), which is an open drain type driver that generates single wire data signal 16. First field effect transistor 702 is grounded through a first polyswitch 703, such as, for example, an RXE110. Part RXE110 is a commercially available component from Raychem. First polyswitch 703 limits current through transistor 702 to protect first field effect transistor 702 in the event that single wire data signal 16 is shorted to a high voltage source.

Continuing with FIG. 4, a drag protection diode 704, such as, for example, a 1N4148, and a third resistor 705 with a value of, for example 330 Ohms, are placed between single wire data signal 16 and receiver input stream 74 in order to prevent microcontroller 10 from dragging down the voltage levels of single wire data signal 16. A reverse protection diode 709 is placed between ground and receiver input stream 74 to protect microcontroller 10 from a negative voltage surge in the event that single wire data signal 16 is shorted to a negative voltage source. Note that while a preferred embodiment of a bus level converter 70 includes the specific component values as previously stated, the spirit of the instant invention may be realized with alternative components and is not limited to the preferred embodiment as shown.

Figure 5:
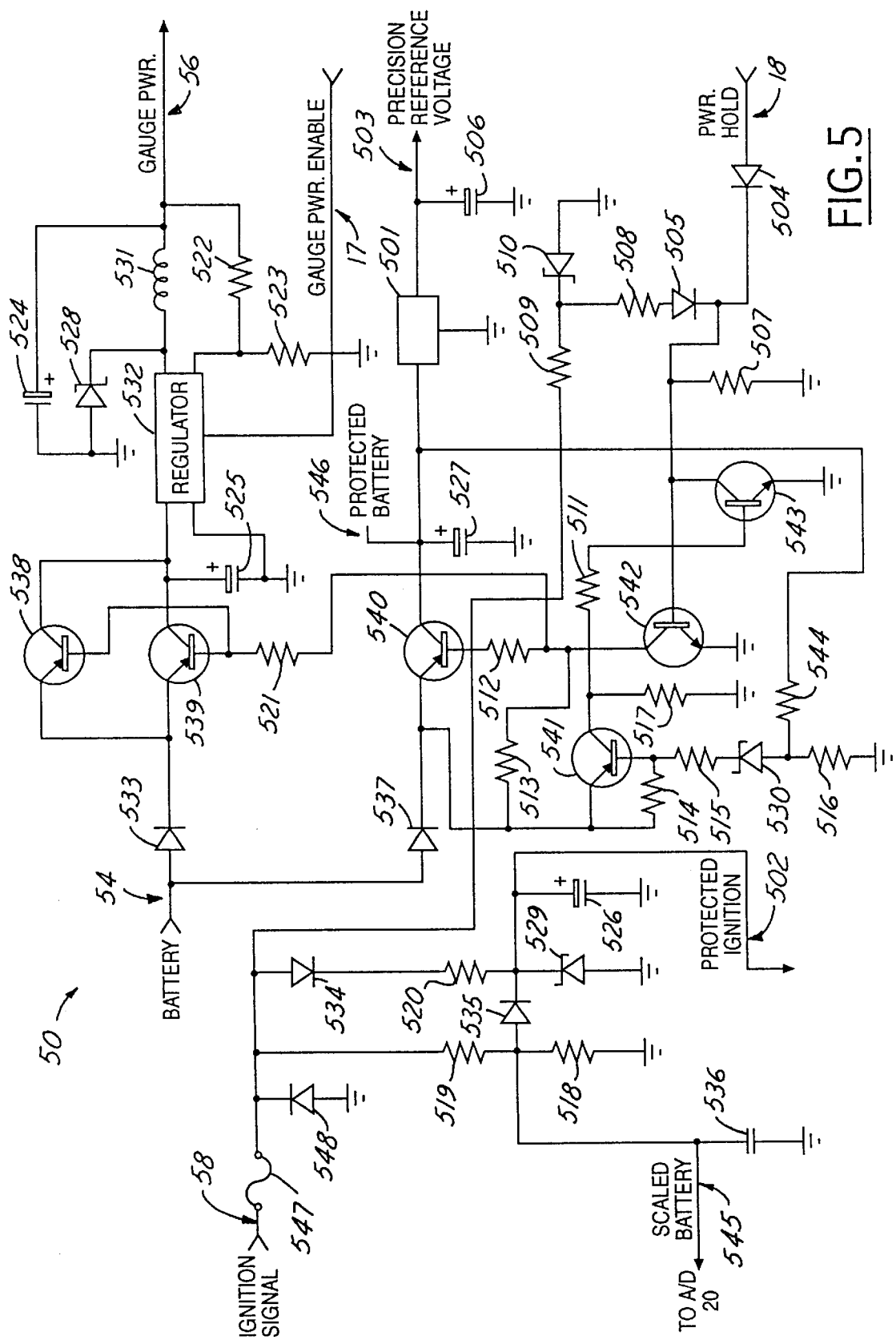
FIG. 5 is a simplified schematic and block diagram of a preferred embodiment of an ignition detector circuit.

Turning now to FIG. 5, a preferred embodiment of ignition detector 50 receives ignition signal 58 and battery voltage signal 54 from the underlying vehicle (not shown). From these signals, ignition detector 50 generates protected ignition voltage 502, a scaled battery signal 545, and a precision reference voltage signal 503, which ignition detector 50 maintains so long as power hold indicator signal 18 is present. Ignition detector 50 also generates gauge power signal 56 so long as gauge power enable 17 is present.

Continuing with FIG. 5, it is preferable that data concentrator 1 operate such that both battery voltage signal 54 and ignition signal 58 must be present to cause microcontroller 10 to reset and thus commence operation. The reset circuit (not shown) may be implemented using conventional comparator circuitry. Note that the presence of either power hold indicator signal 18 or ignition signal 58 is sufficient to generate a protected battery signal 546, and thus generate precision voltage source 503. While power hold indicator signal 18 is not initially present, microcontroller 10 will generate power hold indicator signal 18 as part of its power up sequence. Ignition detector 50 also generates protected ignition voltage 502 and scaled battery 545 at this time. Microcontroller 10 eventually generates gauge power enable 17 which causes ignition detector 50 to subsequently generate gauge power signal 56.

Microcontroller 10 preferably monitors scaled battery 545 to detect the absence of ignition signal 58. The absence of ignition signal 58 does not immediately cause the loss of precision reference voltage source 503 due to the presence of power hold indicator signal 18. Instead, the absence of ignition signal 5, as detected by microcontroller 10 via monitoring of scaled battery 545, preferably causes microcontroller 10 to execute a software controlled power down sequence, which eventually removes gauge power enable 17, causing gauge power signal 56 to drop. This permits gauges (such as gauge G in FIG. 1) to be set to a known position before gauge power signal 56 is removed. After gauge power signal 56 is dropped, microcontroller 10 subsequently drops power hold indicator signal 18. Since neither ignition signal 58 nor power hold indicator signal 18 are present, protected battery 546 drops, causing precision voltage 503 to drop and remove microcontroller 10 power. The foregoing structure and control permit total system shut down such that the vehicle's battery life is extended.

As shown in one aspect of the present invention FIG. 5 pertains to a reverse voltage protection circuit, ignition signal 58 is first fused by means of a second polyswitch 547 and a seventh diode 548. In a preferred embodiment, second polyswitch 547 is preferably an RXE050 with a current rating of 0.5 amps and an untripped resistance of 0.77 ohms. Part No. RXE050 is a commercially available component, and which may be obtained from, for example, Raychem.

Seventh diode 548 is preferably a 1N4004 with a current rating of 1.0 amps. If ignition signal 58, which comes from a vehicle, is hooked up backwards, then the voltage of ignition signal 58 will be negative, causing seventh diode 548, which is biased to ground (i.e., a node to ground, cathode to a node common with polyswitch 547), to conduct. When the current through second polyswitch 547 reaches the predetermined threshold level, namely, the rated current of 0.5 amps, polyswitch will open, effectively fusing the remainder of the circuit in FIG. 5 from the effects of the reversed voltage. When ignition signal 58 is hooked up correctly, it passes through second polyswitch 547 with negligible voltage drop, thus permitting the voltage of ignition signal 58 to be accurately measured.

Continuing with FIG. 5, ignition signal 58 next passes through a resistor divider defined by an eighteenth resistor 519 and a seventeenth resistor 518, which are preferably 0.1% precision resistors with values of, for example, 4.42 K Ohms and 2.00 K Ohms respectively. Ignition signal 58, which is allowed to be between nine and sixteen volts during normal operation, is thus divided down such that the scaled battery 545, which is received by analog-to-digital converter 20, is never greater than five volts when ignition signal 58 is within the nine to sixteen volt range. A seventh capacitor 536 provides noise reduction and may have a value of, for example, 0.1 microfarads. A fourth Zener diode 529, which may be, for example, a 1N4733, is used to maintain protected ignition voltage 502 at a maximum of five volts. In a preferred embodiment, protected ignition voltage 502 is used as the pull-up voltage by one or more of analog voltage signals 22 because a precision voltage source 501 generates insufficient current. A fifth diode 535, which may be, for example, a 1N4148, is used to limit scaled battery 545 to a maximum of five volts plus the diode drop. A nineteenth resistor 520 which may be, for example, 2.2 K Ohms, is used in series with a fourth diode 534, which may be, for example, a 1N4004, in order bias fourth Zener diode 529 up to five volts and to prevent backwash from anything tied to protected ignition voltage 502 when ignition signal 58 drops. A fifth capacitor 526 of, for example, 1 microfarad, is used for noise reduction.

Continuing with FIG. 5, a sixth diode 537 and a third diode 533, each of which may be, for example, a 1N4004, are each used to protect ignition detector 50 from the potentially harmful effects of reversed battery cables on the vehicle. Assuming that battery voltage signal 54 is present, a second transistor 538, a third transistor 539, and a fourth transistor 540, which may each be, for example, a ZTX576 (commercially available from, for example, Zetex), are on if either power hold indicator signal 18 or ignition signal 58 are present. An eleventh resistor 512 and a twentieth resistor 521 limit base currents while supplying sufficient base current to saturate second transistor 538, third transistor 539, and fourth transistor 540 under full load or at maximum collector current.

Eleventh resistor 512 and twentieth resistor 521 limit base currents and have values of, for example, 470 Ohms and 120 Ohms respectively. A fourth capacitor 525 and a sixth capacitor 527 have values of, for example, 47 microfarads each and are used to provide substantial noise reduction. Those skilled in the art will recognize that second transistor 538 and third transistor 539 could be replaced by a single transistor. The present invention utilizes a pair in order to take advantage of a smaller package size while still achieving the requisite current.

Continuing with FIG. 5, a first regulator 532, which may be, for example, a LM2575-ADJ, (commercially available from, for example, National Semiconductor) generates a seven volt gauge power signal 56 when gauge power enable 17 is in the active state. A twenty-first resistor 522 with value of 9.53 K Ohms, a twenty-second resistor 523 with value of 2.00 K Ohms, a third capacitor 524 with value of 330 microfarads, a third Zener diode 528 of type 1N5819, and an inductor 531 with value of 330 microhenrys (commercially available from, for example, Dale, a company of Vishay) are all used to properly implement first regulator 532 in a circuit which is recommended by first regulator's 532 manufacturer, National Semiconductor. Those skilled in the art will recognize that other regulators and support circuitry could be substituted, so long as the previously stated fundamental goals of the present invention are met.

Circuit 50 also includes an apparatus for regulating an input voltage, such as battery 54, to a predetermined output voltage. Precision voltage source 501, which may be, for example, an LP2950ACZ-5 (commercially available from, for example, National Semiconductor), is provided and generates precision voltage 503 of five volts. A second capacitor 506, which may have a value of, for example, 1 microfarad, is used to reduce noise. As previously explained, precision reference voltage source 501 will generate precision voltage 503 so long as protected battery 546 remains active.

Addressing the remainder of FIG. 5, ignition detector 50 implements the feature of either ignition signal 58 or power hold indicator signal 18 causing protected battery 546 to be active by means of a diode, using a first diode 504 and a second diode 505, which may each be, for example, a 1N4148. An eighth resistor 508 and a ninth resistor 509, which may each have a value of, for example, 470 Ohms, are used in conjunction with a second Zener diode 510, which may be, for example, a 1N4733, in order to limit voltage at the base of a sixth transistor 542 to five volts when on. By being on, sixth transistor 542 causes fourth transistor 540 to be on, thus maintaining protected battery 546 in the active range. A seventh resistor 507, which may have a value of, for example, 100 K Ohms, assures that sixth transistor 542 will be off if neither first diode 504 nor second diode 505 are on. A twelfth resistor 513, which may have a value of, for example, 10 K Ohms, is used to guarantee that when sixth transistor 542 is off, the bases of second transistor 538, third transistor 539, and fourth transistor 540 will not be floating.

Another aspect of the present invention relates to an over voltage protection circuit in the power regulation portion of circuit 50. Specifically, the remaining portion of FIG. 5 provides battery over voltage protection such that excessive voltage on battery voltage signal 54 shuts off the system but does not burn out ignition detector 50. Protection is provided by a fifth Zener diode, 530, which may be, for example, a 1N4746 with an avalanche differential of eighteen volts, in conjunction with a fifteenth resistor 516, which may have a value of, for example, 100 Ohms, and a twenty-third resistor 544, which may have a value of, for example, 4.7 K Ohms. Fifteenth resistor 516 and twenty-third resistor 544 provide a predetermined voltage threshold (i.e., bias) for one side of fifth Zener diode 530, namely, the anode. Through a thirteenth resistor 514 and a fourteenth resistor 515, which may have values of 47 K Ohms and 3.9 K Ohms, respectively, fifth Zener diode 530 monitors battery voltage signal 54 on its other side (i.e., cathode). When the voltage applied to the emitter of pnp transistor 540 (i.e., battery voltage less one diode drop) exceeds a trigger level, namely, the Zener diode 530 breakdown threshold plus the predetermined bias provided by resistor 544/resistor 516, Zener diode 530 becomes exposed to its avalanche differential voltage and turns on. It will immediately cause a fifth transistor 541, which may be, for example, a 2N4403, to turn on through a sixteenth resistor 517, which may have a value of, for example, 47 K Ohms. This conduction, in turn, causes a seventh transistor 543, which may be, for example, a 2N4401, to turn on through a tenth resistor 511, which may have a value of, for example, 10 K Ohms, which drops the voltage at the base of sixth transistor 542 (which may be, for example, an MP5A42), causing it to turn off, thereby reducing protected battery 546 to an inactive state. Transistors part nos. 2N4401, 2N4403 and MPSA42 are commercially available components from, for example, Motorola. Twenty-third resistor 544 (i.e., resistive feedback network), which may have a value of, for example, 4.7 K Ohms, is instrumental in forming feedback hysteresis by initially elevating the input voltage needed to cause Zener 530 to breakdown, and, once the protection commences, by lowering the threshold for avalanche, such that ignition detector 50 cannot turn itself back on during the shut down process. In effect, the hysteresis loop prevents operation of the power regulating transistor (e.g., 540) in a linear region (which prevents it from excessive power dissipation).

Thus, an embodiment of the present invention for regulating an input voltage having an over voltage protection feature includes an input transistor, such as pnp transistor 540, a regulator device, such as source 501, Zener diode 530, a feedback resistor 544, and a disable circuit for turning off transistor 540 when the input voltage (Vin) exceeds a threshold level. The disable circuit may thus comprise another pnp transistor 541, npn transistor 543 and npn transistor 542.

Turning now to FIGS. 6A–6E, a preferred embodiment of data structures stored in erasable memory 60 includes four principal data structures.

FIG. 6A shows a analog signal filter table 602, comprised of one or more channel filter bytes 604, with each channel filter byte 604 corresponding to one digital voltage equivalent 24 (shown in FIG. 1). The use of channel filter bytes 604 by microcontroller in converting digital voltage equivalents 24 into transmitter output stream 72 is detailed in FIGS. 7 and beyond. In a preferred embodiment, each channel filter byte 604 is one nibble and indicates a power of two, with everything greater than seven being treated the same as seven.

FIG. 6B shows a pulse signal conversion table 606, which preferably includes a pulse conversion constant 607 and load configuration indicator 605. Pulse conversion constant 607 is preferably four bytes, unsigned, and is used by microcontroller 10 to convert filtered pulse signal 44 into a portion of transmitter output stream 72. In a preferred embodiment, filtered pulse signal 44 represents the pulses of an external tachometer driver (not shown) with some number of pulses per engine revolution, such as, for example, four. Pulse conversion constant 607 makes use of the number of pulses per engine revolution such that microcontroller 10 may divide pulse conversion constant by the instantaneous average time between incoming pulses of filtered pulse signal 44 to compute a quotient which represents the number of engine revolutions per minute, or RPM. Microcontroller 10 by means of UART 15 sends RPM quotient to bus level converter 70 via transmitter output stream 72, wherein it is converted into single wire data signal 16 and sent to an attached tachometer gauge (not shown).

Continuing with pulse signal conversion table 606 of FIG. 6B, load configuration indicator 605 is a two-state value used by microcontroller 10 to set the state of load type indicator 46 which may cause counter/timer filter 40 to switch in a load as detailed in FIG. 3A.

FIG. 6C shows a digital equivalent conversion table 608, which is comprised of one or more channel conversion entries 610, each of which corresponds to one digital voltage equivalent 24. Channel conversion entry 610 is used to convert digital voltage equivalent 24 into the value which it represents, such as, for example, 147 degrees Fahrenheit, or 89 psi, using a series of points and slopes which define a translation curve. Each channel conversion entry 610 includes slope indicator 612 which indicates whether the output conversion increases or decreases with increases of the voltage of corresponding digital voltage equivalent 24. Channel conversion entry 610 also includes a series of one or more table rows, each of which includes three data words, a scaled ratio 616, a slope 618, and an offset 620. The quantity of such table rows is also maintained in channel conversion entry 610, as a number of table rows 614. Finally, channel conversion entry 610 also includes a maximum scaled ratio 622 which defines an endpoint for channel conversion entry 610.

To utilize a specific channel conversion entry 610 for actual conversion, an incoming scaled ratio computed from digital voltage equivalents 24 is compared to maximum scaled ratio 622. If incoming scaled ratio exceeds maximum scaled ratio 622, then the maximum scaled ratio 622 is used as the incoming scaled ratio, and the last row of the channel conversion entry is used to perform the conversion. Otherwise, using number of table rows 614, each scaled ratio 616 of the channel conversion entry 610 is compared to the incoming scaled ratio, until a scaled ratio 616 is found which is not greater than the incoming scaled ratio. Once this particular scaled ratio 616 is found, the incoming scaled ratio is multiplied by the corresponding slope 618. Then the corresponding offset 620 is added to the product, resulting in the converted answer. If the incoming scaled ratio is smaller than all of the scaled ratios 616 in the channel conversion entry 610, then the smallest scaled ratio 616 is used as the incoming scaled ratio. Also, note that if slope indicator 612 indicates a negative slope, then the product of the corresponding slope 618 and the incoming scaled ratio is negated before summing with offset 620.

In a preferred embodiment, slope indicator 612 and number of table rows 614 are bytes, while scaled ratio 616, slope 618, offset 620, and maximum scaled ratio 622 are words. Those skilled in the art will recognize that the number of bytes associated with these structures may be increased or decreased, depending upon the amount of precision desired.

FIG. 6D shows a speedometer conversion map 624, which includes one or more speedometer conversion tables 625, such that multiple speedometers may be used, as is desirable in the case of, for example, competition ski boats. In particular, another aspect of the present invention relates to an improved method for determining vehicle speed using a pressure. Speedometer conversion table 625 preferably includes a zero pressure offset 626, a gain 628, a trigger 630, a transducer intercept 632, an adjustment 634, and a multiplication factor 636. In a preferred embodiment, these are used to compute speed according to the following equation, which is derived from the Bernoulli principle:

$$\text{SPEED} = \left((\text{gain} - (\text{adjustment} * \text{multiplication factor}))(X - \text{zero pressure offset})\right)^{1/2}$$
$$- (\text{trigger}) / (X - \text{transducer intercept})$$

where X is the digital voltage equivalent 24 associated with pressure voltage 34. A first speed component, specifically the square root portion of the above equation, is an implementation of the Bernoulli principle, which states that speed is equal to the square root of the quotient of pressure divided by water density. Since water density may change substantially with salinity, an adjusting mechanism is desirable in the square root equation to account for density changes. This is accomplished by means of adjustment 634 and multiplication factor 636, which are used to alter gain 628 and thus adjust the square root contribution. In a preferred embodiment, adjustment 634 comes from a switch, preferably a double pole rocker style switch, with a first and a second active positions, as well as a repose position, which is read as one of analog voltage signals 22 and converted into digital voltage equivalent 24. The switch (not shown) is also, preferably, use-actuated by, for example, a vehicle operation. Adjustment 634 is preferably a signed byte which may be increased or decreased accordingly. Multiplication factor 636 is selected according to the anticipated values of gain 628, such that adjustment 634 may have a significant effect. For example, if gain 628 is of the range 300–400, then setting multiplication factor 636 to two permits gain 628 to be adjusted by as much as ±127 times 2=254, providing ample range to accommodate many water densities.

Continuing with FIG. 6, a second speed component, namely the subtracted quotient of the speedometer equation, is believed to account for the effects of friction, when skews Bernoulli's equation when the pressure (as represented by X) is relatively small, such as, for example, less than two pounds per square inch in a Pitot tube system (e.g., during low speeds).

Those skilled in the art will recognize that speedometers for land-based vehicles, such as, for example, trucks or cars, could be implemented by means of raw voltage pulse signal 42. The present invention is not intended to be limited to using speedometer conversion map 624 exclusively for generating speedometer output.

FIG. 6E shows a voltage conversion constant 638, which in a preferred embodiment is one word, is stored for use in converting one of analog voltage signals 22, which is representative of actual battery voltage signal 54, into the equivalent battery volts. Voltage conversion constant 638 is determined by the values selected for seventeenth resistor 518 and eighteenth resistor 519, as discussed in FIG. 5, and is used to convert digital voltage equivalent 24 into battery volts for transmitter output stream 72.

Figure 7:
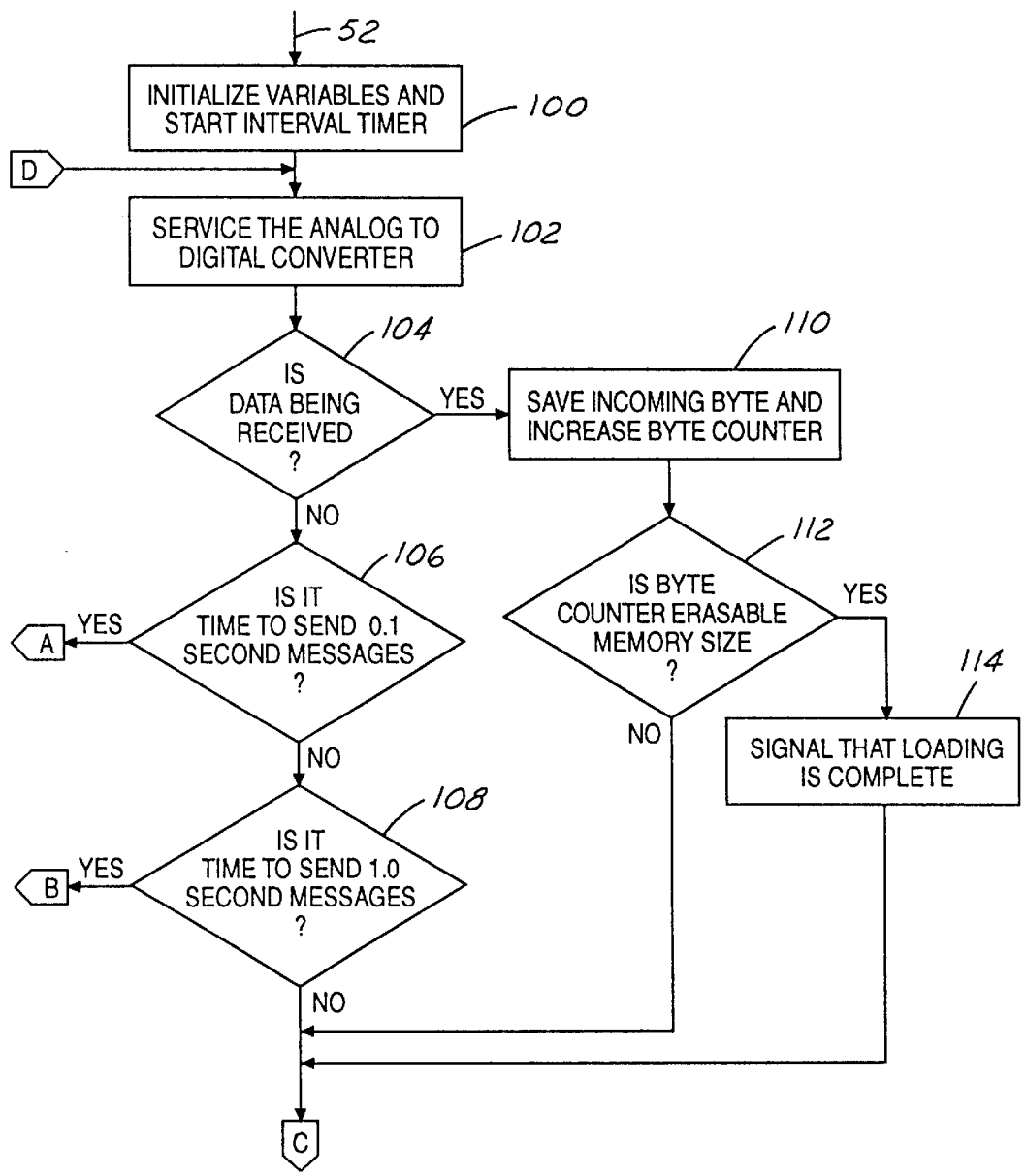
FIG. 7 is a flow chart of the control established by a preferred data concentrating apparatus.

Turning now to FIG. 7, a flow chart of the controlling mechanism for a data concentrating apparatus begins when microcontroller reset signal 52 causes microcontroller 10 to begin executing instructions stored in program memory 14, starting with initializing variables in data memory 12 and starting an internal microcontroller interval timer as indicated in step 100. Internal interval timer is used to determine time intervals at which one or more digital voltage equivalents 24 should be converted and transmitted via transmitter output stream 72. As defined in "Joint SAE/TMC Electronic Data Interchange Between Microcomputer Systems In Heavy-Duty Vehicle Applications-SAE J1587", which is a recommended practice published by the Society of Automotive Engineers, microcontroller 10 preferably uses multiple time intervals such that some channels are converted more often than others. In a preferred embodiment, microcontroller 10 does conversions and sends messages at intervals of 0.1 seconds for tachometers and speedometers (desirable to obtain updates more frequently), and 1.0 seconds for fuel, voltage, temperature, oil pressure, and trim (these parameters change more closely, therefore less frequent updates are acceptable in some circumstances). Those skilled in the art will recognize that the present invention is not intended to be limited in scope to this specific application and it is included only as an example to illustrate the operational principles thereof.

Continuing with FIG. 7, the next step 102 is to service analog-to-digital converter 20, which is detailed in FIG. 11. Next microcontroller 10 checks to see whether it is receiving data 104 via receiver input stream 74. If microcontroller 10 detects incoming data, such as might be sent by a diagnostic device to reprogram the contents of erasable memory 60, then the incoming data byte is saved and the byte counter is increased 110. If the byte counter indicates that a quantity of bytes of size equivalent to erasable memory 60 has been received 112 then it signals that the downloading of information is complete 114.

If microcontroller was not receiving data 104, then it checks to see whether a signal indicates that transmitter output stream 72 containing conversions of digital voltage equivalents 24 should be generated for those channels which are to be converted and sent every 0.1 seconds 106, such as, for example, tachometers and speedometers. If this is the case, then microcontroller 10 continues to connector A, which is detailed in FIG. 13. Otherwise, microcontroller 10 checks to see whether a signal indicates that transmitter output stream 72 containing conversions of digital voltage equivalents 24 should be generated for those channels which are to be converted and sent every 1.0 seconds 108, such as, for example, oil pressure and fuel gauges. If this is the case, then microcontroller 10 operates as detailed in FIG. 17. Otherwise, microcontroller continues as illustrated in FIG. 8.

Figure 8:
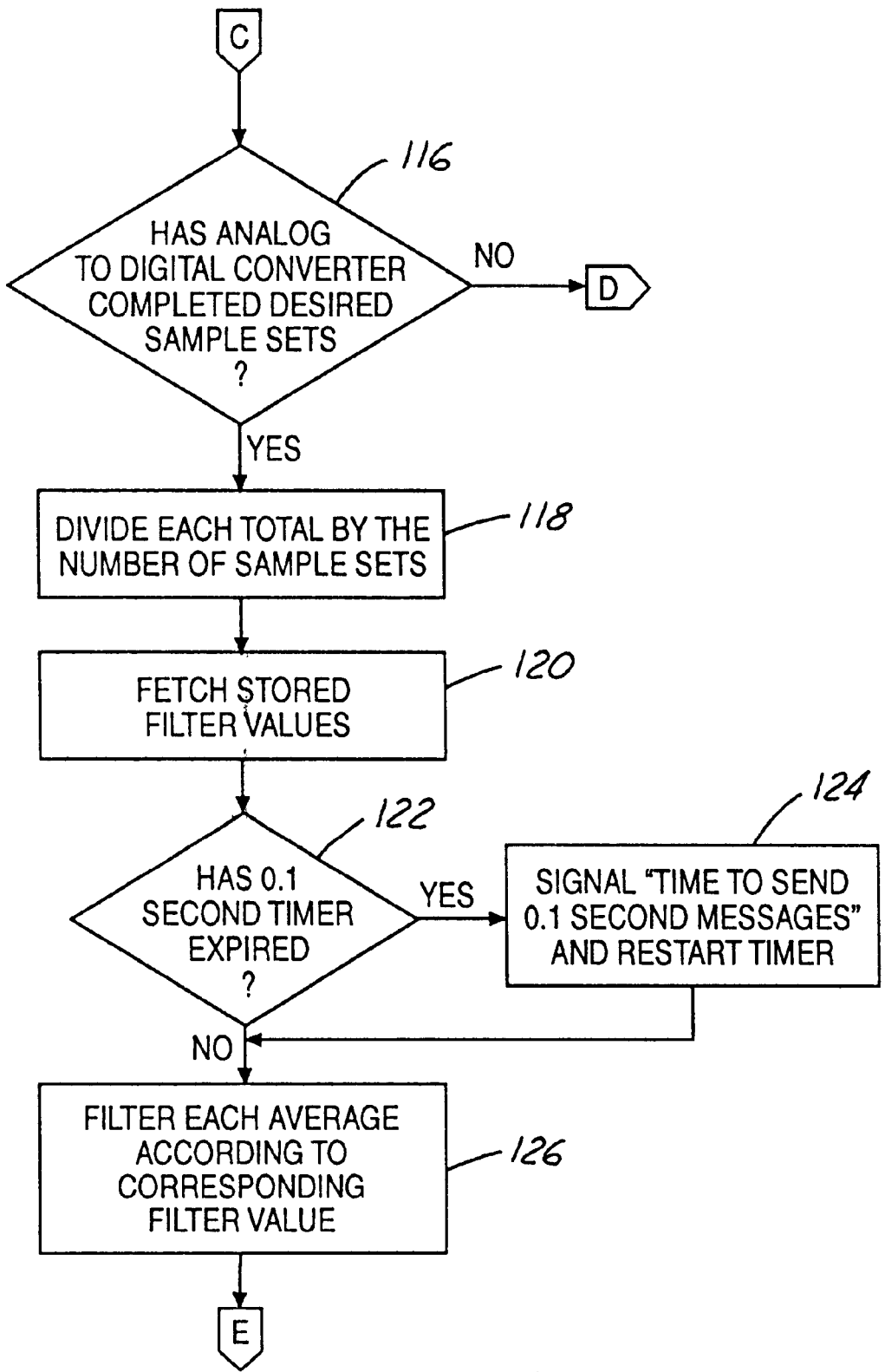
FIG. 8 is a first continuation sheet of the flow chart of FIG. 7.

Turning now to FIG. 8, a first continuation of the flow chart of the controlling mechanism for a data concentrating apparatus continues at letter C with microcontroller 10 checking to see whether all channels of analog-to-digital converter 20 have been converted for some desired number of sample sets 116. Each channel is preferably converted multiple times, such as, for example, seven, and the conversions are accumulated into a sum, along with the previous average value. This is preferable to reduce the effects of noise which may be present in analog voltage signals 22 and/or pressure voltage 34. If analog-to-digital converter 20 is not finished, then microcontroller 10 follow the path indicated by letter D, which is to return to FIG. 7 and repeat. Otherwise, microcontroller 10 continues with FIG. 8 to divide the accumulated sums as previously described by the number of samples therein 118, such as, for example, eight in the example given above (seven new samples plus one previous value).

Next the channel filter bytes 604 as stored in the analog signal filter table 602 in erasable memory 60 are fetched in preparation for filtering 120. Microcontroller 10 then checks to see whether the interval timer which measures 0.1 seconds has expired 122. If it has, then a signal is generated which indicates that it is now time to send messages corresponding to those channels whose conversions are to be sent every 0.1 seconds, such as, for example, those for tachometers and speedometers 124.

Figure 12:
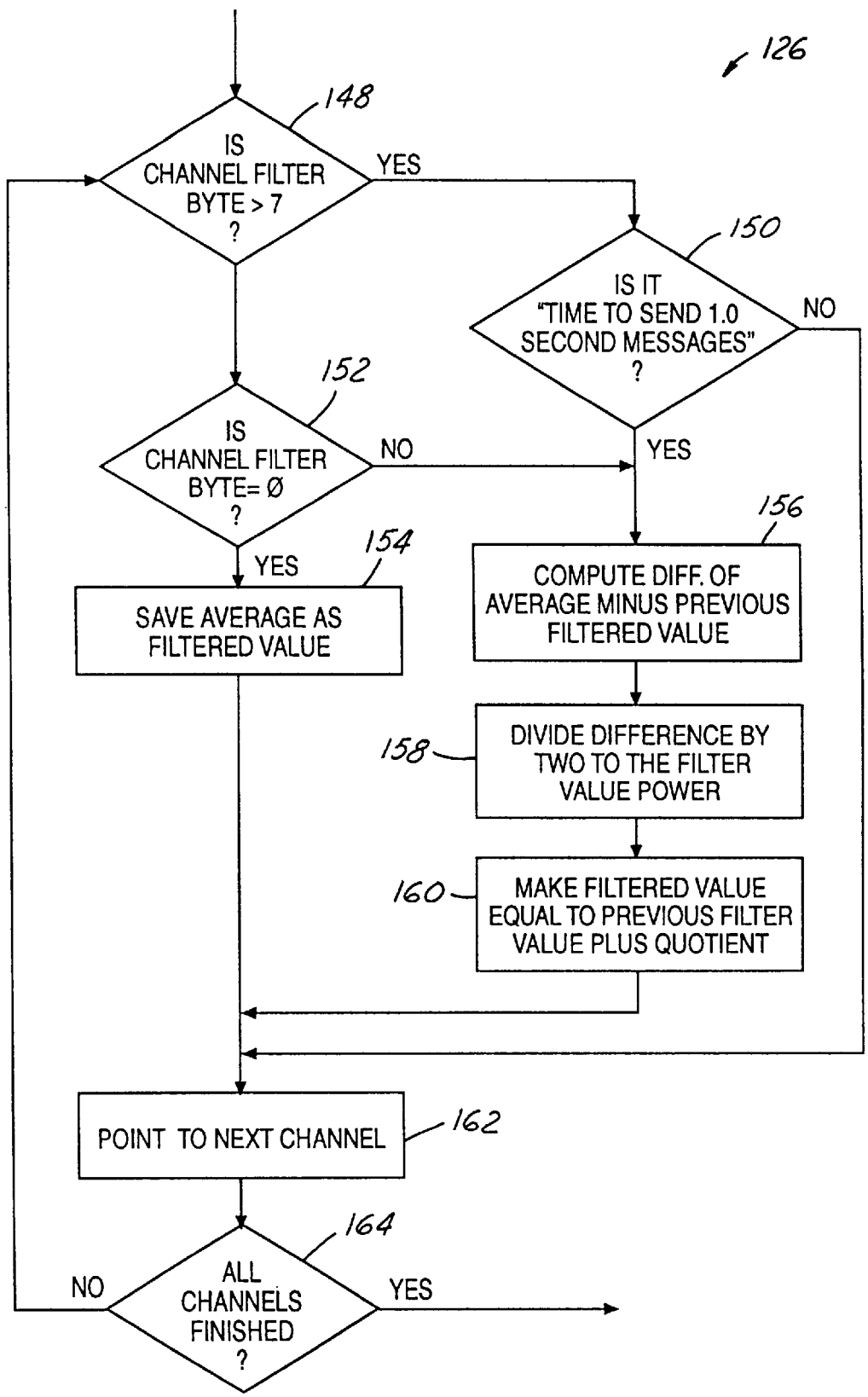
FIG. 12 is a flow chart illustrating the control involved in filtering the channel averages in a data concentrating apparatus.

Continuing with FIG. 8, microcontroller 10 now filters each channel average 126 as computed in step 118, the details for which are provided in FIG. 12. Operation then passes to FIG. 9, as noted by letter E.

Turning to FIG. 9, microcontroller 10 checks to see whether the interval timer which measures 1.0 second time intervals has expired 128. If it has not, then microcontroller 10 returns to FIG. 7 and repeats, as denoted by connector D. If the interval timer has expired, then microcontroller 10 continues with FIG. 9 and a signal is generated which indicates that it is now time to send messages corresponding to those channels whose conversions are to be sent every 1.0 seconds, such as, for example, those for fuel and oil pressure 130.

Additionally, the 1.0 second interval timer may also be utilized to time the controlled power down of the data concentrating apparatus, which preferably takes place when ignition signal 58 is removed as discussed with FIG. 5. Hence in FIG. 9 microcontroller 10 next looks at whether the system is in the process of powering down 132, which is a preferred embodiment takes place over five seconds. If the system is not powering down, then microcontroller returns to FIG. 7 and repeats as denoted by connector D.

If it is powering down, then microcontroller continues with FIG. 9 and reduces the power down second counter by one 134. If the counter indicates that more power down time remains 136, then microcontroller 10 returns to FIG. 7 and repeats as denoted by connector D.

If power down counter has gone to zero in step 136 of FIG. 9, signaling that the power down cycle is complete, then in step 138 microcontroller 10 saves adjustment 634 to erasable memory 60 if it has been altered as discussed in FIG. 6. This is preferable because it limits writing to erasable memory 60, thereby extending its useful life. Operation proceeds to FIG. 10 as denoted by connector F.

Turning now to FIG. 10, a third continuation of the flow chart of the controlling mechanism for a data concentrating apparatus begins with connector F leading into the final step of power down operation 140, which is where microcontroller 10 drops power hold indicator signal 18 to ignition detector 50. This causes ignition detector 50 to drop power as detailed in FIG. 5. Microcontroller 10 will then return to FIG. 7 and attempt to repeat its cycle, as denoted by connector D, during which microcontroller 10 will be shut down when ignition detector 50 removes circuit power signal 51.

Turning now to FIG. 11, a detailed flow chart of step 102, servicing analog-to-digital converter 20 in a data concentrating apparatus, begins by waiting until the most recent conversion has been completed 142. When conversion for the present channel is complete, the output of analog-to-digital converter 20 is added to the accumulation of the samples in the set for that channel 144, as discussed in FIG. 8. Continuing with FIG. 11, the next step is to point at the next channel in sequence and direct the analog-to-digital converter 20 to begin converting that channel 146. Note that if the last channel has been converted then the pointer returns to the first channel. Those skilled in the art will recognize that while this procedure is necessary for serial analog-to-digital converter 20, alternative embodiments which utilized a parallel converter would proceed in a parallel fashion and obtain one sample set at a time.

Turning now to FIG. 12, which is a detailed flow chart of step 126, filtering the channel bytes begins with step 148, checking the value of the first channel's channel filter byte 604. If the value is seven or less, then the next step is to check for a zero 152. If channel filter byte 604 is zero, then the average value computed in step 118 of FIG. 8 is used as the final filtered value 154.

Continuing with FIG. 12, if channel filter byte 604 was not greater than seven but was nevertheless non-zero, then in step 156 the previous filtered value for this channel is subtracted from the average value computed in step 118 of FIG. 8. Continuing with FIG. 12, in step 158 this difference is divided by two raised to the power of channel filter byte 604. For example, if channel filter byte 604 is three, then the difference is divided by two to the third power, or eight. The quotient is then added to the previous filtered value and saved as the present filtered value 160. Channel filter byte 604 thus controls how much change must be present between subsequent filtered values for a specific channel before the system will acknowledge the new value.

Returning back to step 148 of FIG. 12, if the channel filter byte is greater than seven then in step 150 the timing flag which is used to signal the 1.0 second message conversions is checked. If this flag is set then the differencing procedure of steps 156, 158 and 160 is performed for this channel; otherwise the system leaves the previous filtered value unchanged, and it becomes the present filtered value.

Having processed the average value from step 118 of FIG. 8 into a present filtered value for this channel according to the corresponding channel filter byte 604, microcontroller 10 continues in FIG. 12 by pointing to the next channel in sequence 162. If more channels remain to be filtered 164, then the process is repeated for the next channel. Otherwise the filtering process is complete and control returns to Step 128 of FIG. 9.

Figure 13:
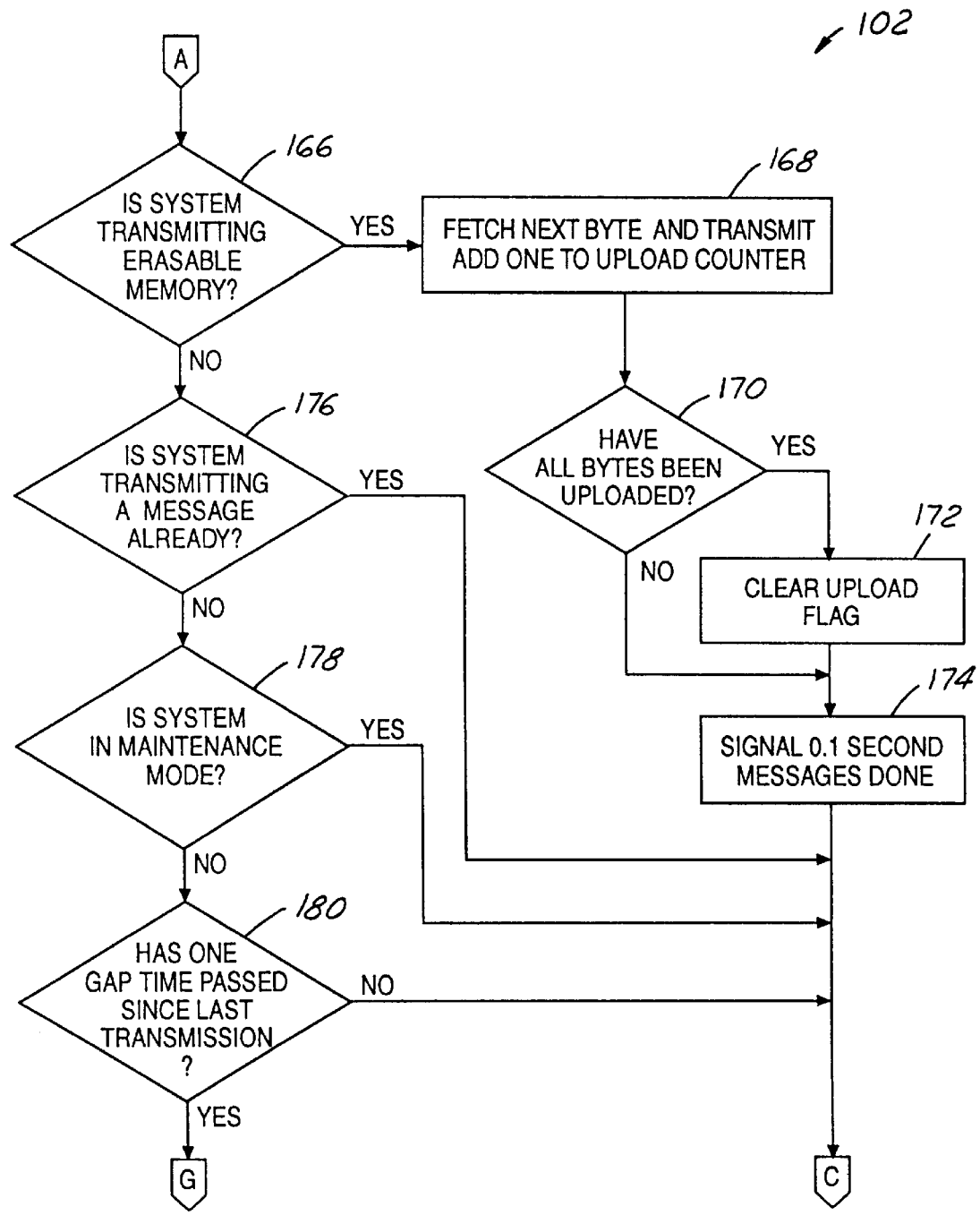
FIG. 13 is a flow chart showing preparation for conversion and transmission of 0.1 second messages in a data concentrating apparatus.

Turning now to FIG. 13, a flow chart showing preparation for conversion and transmission of 0.1 second messages in a data concentrating apparatus begins by checking to see whether the system is presently transmitting the contents of erasable memory 60 to, for example, a diagnostic device 166, such as might be done when the system was in a diagnostic mode. If the system is thus occupied then the 0.1 second interval timer is used to control the timing of the flow of bytes to the diagnostic device, so the next byte of memory is transmitted and the counter which tracks how many bytes have been uploaded is increased by one 168. If this byte was the last byte of memory as indicated by the counter 170, then the system clears a flag to signal that it is no longer uploading erasable memory bytes 172. A signal is given to indicate that the system has finished its 0.1 second message servicing and operation continues at connector C of FIG. 8.

Continuing with FIG. 13, if the system was not transmitting erasable memory bytes 166 then it is next ascertained as to whether the system is busy transmitting a previous message 176. If this is the case, then operation continues at connector C of FIG. 8.

Continuing with FIG. 13, if the system was not busy transmitting a previous message 176, then a check is made to see whether the system is in maintenance mode 178. Such might be the case, for example, if the system is in maintenance mode but is being reprogrammed by an external diagnostic device and is thus receiving data bytes. If the system is in maintenance mode then operation continues at connector C of FIG. 8.

Continuing with FIG. 13, if the system is not in maintenance mode 178 then the system timing is checked to see whether sufficient time has passed since the last transmission such that the next transmitted byte will be taken as the start of a new message 180. This minimum time quantity is known as a transmission gap time, or alternatively, a bus access time. Those skilled in the art will recognize that the amount of this gap time may be any time quantity greater than the time to transmit one character. For example, section 4.2.1.1 of "Serial Data Communications Between Microcomputer Systems In Heavy-Duty Vehicle Applications-SAE J1708", which is a recommended practice published by the Society of Automotive Engineers, defines such a bus access time as a sum of several components, one of which is two bit times. If sufficient time has not passed to denote the start of a new message 180, then operation continues at Connector C of FIG. 8. Otherwise operation continues as detailed in FIG. 14 at connector G.

Figures 14, 15:
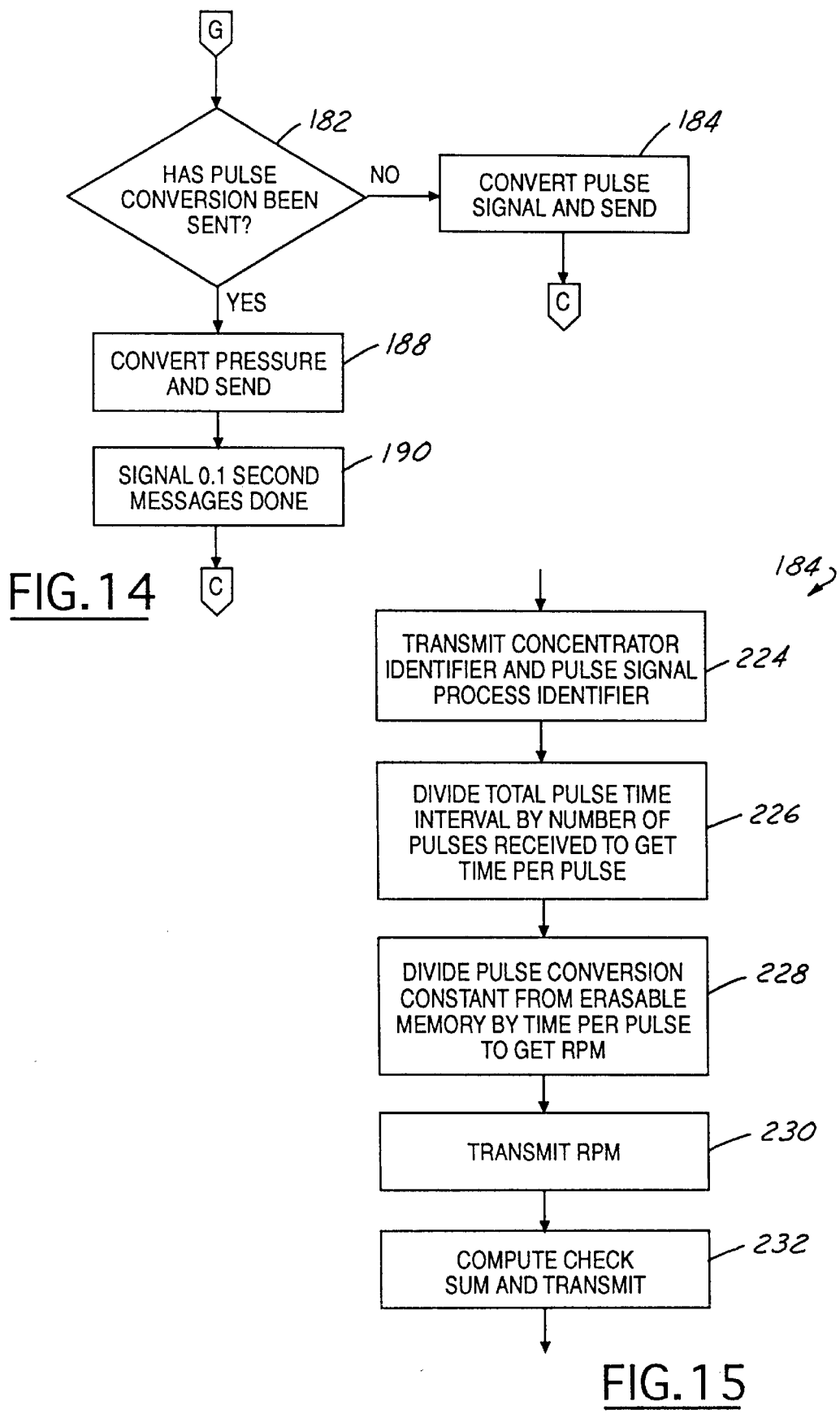
FIG. 14 is a first continuation sheet of the flow chart of FIG. 13.
FIG. 15 is a flow chart showing the conversion and transmission of a pulse-type input signal.

Turning now to FIG. 14, a first continuation of a flow chart showing preparation for conversion and transmission of 0.1 second messages in a data concentrating apparatus begins by checking to see whether a message containing a conversion corresponding to filtered pulse signal 44 has been transmitted 182. If it has not been transmitted, then the signal is converted and sent 184. Operation then continues with Connector C in FIG. 8.

Continuing with FIG. 14, if the pulse conversion has been sent already 182, then the system converts the digital voltage equivalent associated with pressure voltage 34 and transmits it 188. The system then signals that all 0.1 second messages have been processed 190, and operation continues with Connector C in FIG. 8. Those skilled in the art will recognize that while a preferred embodiment transmits converted pulse signal and converted pressure signal at 0.1 second intervals, these could either one be processed on a different time boundary. The timing regarding when to convert and send signals is determined by the need for updated information in the vehicle in which the system is installed. Those skilled in the art will also recognize that more than one raw voltage pulse signal 42 could be processed in the described fashion, as well as more than one raw pressure signal 32. As stated previously, the combination of signals to be processed is determined by the vehicle in which data concentrator 1 resides. One of each signal is presented here for clarity.

Turning now to FIG. 15, conversion and transmission of pulse-type input signal as referenced in step 184 of FIG. 14 begins with transmitting the identifier of data concentrator 1 sending the message, followed by the process identifier associated with the pulse signal 224. These identifiers are preferably used to identify messages of interest by devices receiving single wire data signal 16. Filtered pulse signal 44 is next converted into rotations per minute by first dividing the total pulse time interval by the number of pulses received during the interval 226, which yields an average time per pulse. For example, an interval time of 0.09 seconds and a pulse count of 18 yields an average time per pulse of 0.09/18=0.005 seconds.

The average time per pulse is divided into pulse conversion constant 607 from erasable memory 20 in step 228. When used to measure engine speed, for example, pulse conversion constant 607, which is described generally in FIG. 6, preferably has units of rotations per pulse times seconds per minute, such that dividing pulse conversion constant 607 by seconds per pulse will yield rotations per minute when units are canceled. Continuing with FIG. 15, the resulting RPM quotient from the division is transmitted 230, and then a checksum is computed and transmitted to complete the message 232. Note that in a preferred embodiment, a message thus consists of an identifier associated with the concentrator, a process identifier associated with the parameter whose conversion is to be transmitted, one or more data bytes which contain the actual conversion, and a checksum which when added to the other message bytes causes the total to be zero, modulo 256. Those skilled in the art will recognize that while the instant invention employs this signaling protocol, a variety of alternative protocols could also be successfully employed. The protocol described in FIG. 15 was selected because it embodies the protocol described in "Joint SAE/TMC Electronic Data Interchange Between Microcomputer Systems In Heavy-Duty Vehicle Applications-SAE J1587".

Figure 16:
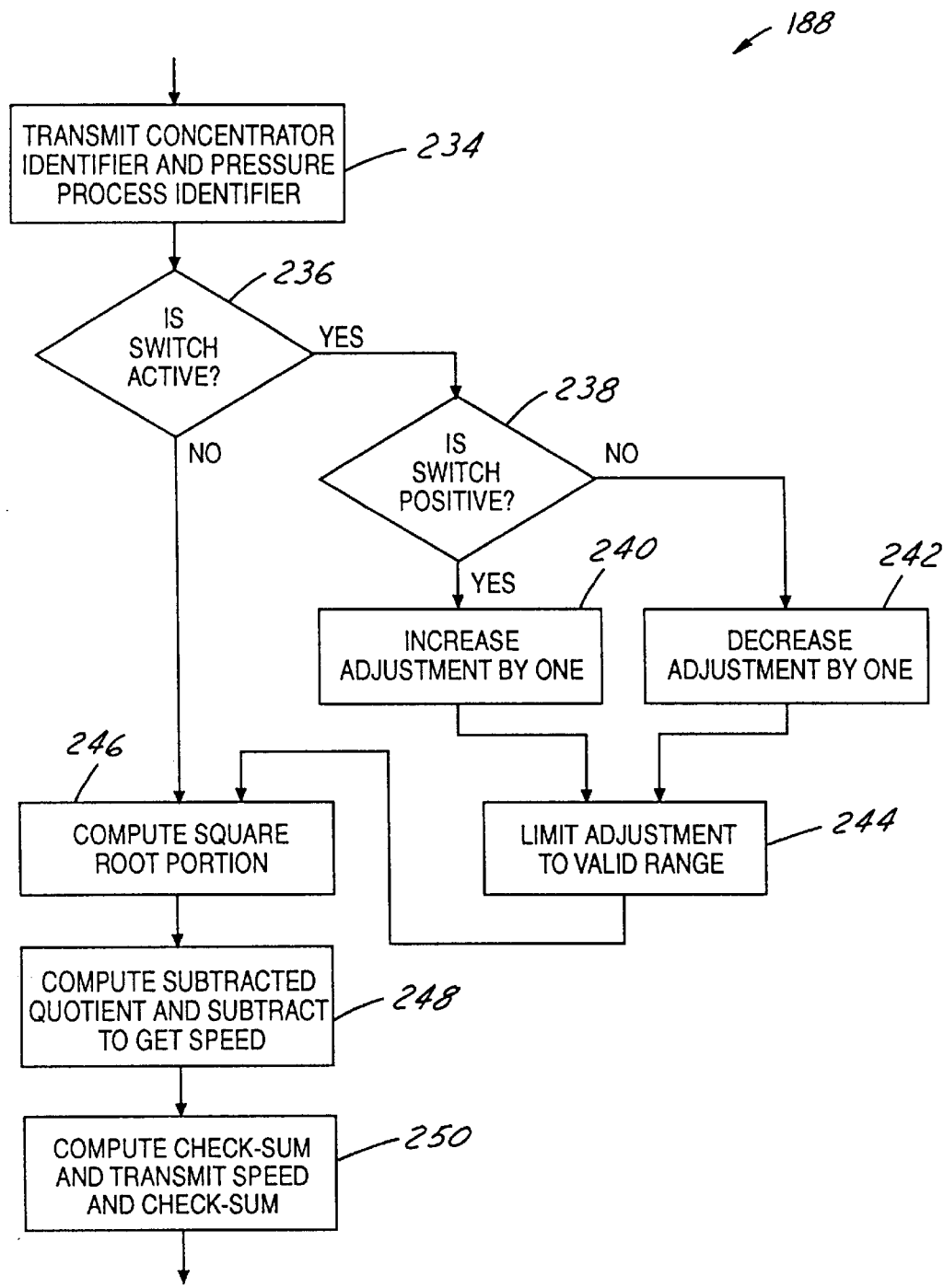
FIG. 16 is a flow chart showing the conversion and transmission of a pressure-type input signal.

Turning now to FIG. 16, conversion and transmission of a pressure-type input signal as referenced in step 188 for FIG. 14 begins with transmitting data concentrator's 1 identifier and the process identifier associated with the pressure signal 234. Next, digital voltage equivalent 24 associated with a switch which is read as one of analog voltage signals 22 and is used to adjust speedometer as described in FIG. 6 is read to determine whether switch is being activated 236. If switch is being activated, then the value of digital voltage signal 24 is examined to determine whether switch is being depressed in the positive direction 238. If positive, then adjustment 634 as described in FIG. 6 is increased by one 240. If not positive, then adjustment 634 as described in FIG. 6 is decreased by one 242. In either case, adjustment 634 as described in FIG. 6 is then limited 244 to be within the range of, for example, −127 to +127.

Continuing with FIG. 16, if switch is inactive or has been recognized, then square root portion is computed 246 according to the first part of the equation from FIG. 6, which is:

$$((\text{gain}-(\text{adjustment} * \text{multiplication factor}))(X-\text{zero pressure offset}))^{1/2}$$

As detailed in FIG. 6, square root portion is computed by subtracting the product of adjustment 634 times multiplication factor 636 from gain 628 and then multiplying by the difference of digital voltage equivalent 24 (X in the above equation) minus zero pressure offset 626, where gain 628, multiplication factor 636, and zero pressure offset 626 are all computed from values stored in erasable memory 20 and adjustment 634 is based on a number read from erasable memory 60 as adjusted by switch changes as denoted in FIG. 16 in steps 238, 240, 242, and 244.

Continuing with FIG. 16, subtracted quotient is next computed and subtracted from square root portion to arrive at speed 248. Subtracted quotient is computed from the second portion of the equation in FIG. 6, which is:

$$(\text{trigger})/(X-\text{transducer intercept})$$

As detailed in FIG. 6, subtracted quotient is computed by dividing trigger 630 by the difference of digital voltage equivalent 24 (X in the above equation) minus transducer intercept 632, where transducer intercept 632 and trigger 630 are both read from erasable memory 60. After computation, quotient is subtracted from square root portion to arrive at speed.

Continuing with FIG. 16, a checksum is computed and then speed is transmitted, followed by the computed checksum 250. This completes the message. Note that in a preferred embodiment, checksum is computed in the same fashion as described in FIG. 15 at step 232.

Turning now to FIG. 17, a flow chart showing preparation for conversion and transmission of 1.0 second messages in a data concentrating apparatus begins from connector B by checking to determine whether the system is already transmitting a message 192. If message transmission is already in progress, then operation passes to FIG. 8, as denoted by connector C. If the system is not transmitting a message, then the mode of system operation is examined to see whether the system is in maintenance mode 194. If the system is in maintenance mode, then operation passes to FIG. 8, as denoted by connector C. If the system is not in maintenance mode, then a check is made to determine whether at least one gap time has transpired since the transmission of the most recent character 196. This is similar to the test made in FIG. 13 at step 180. Continuing with FIG. 17, if a gap time has not passed then operation passes to FIG. 8 as denoted by connector C. If a gap time has passed, then operation continues with FIG. 18 as denoted by connector H.

Turning now to FIG. 18, a first continuation of a flow chart showing preparation for conversion and transmission of 1.0 second messages begins by checking to see whether a conversion for battery voltage has been transmitted yet 198. If it has not been sent, then battery voltage is converted and transmitted 200, which is detailed in FIG. 19. Continuing with FIG. 18, operation then passes to FIG. 8 as denoted by connector C. If battery voltage has been transmitted 198, then digital voltage equivalent 24 of analog voltage signal 22 is converted and transmitted 202. This step may be repeated for each unique analog voltage signal 22 in the system. Once all analog voltage signals 22 have been converted and sent, the system signals that all 1.0 second messages have been transmitted, and operation resumes with FIG. 8 as denoted by connector C.

Figure 19:
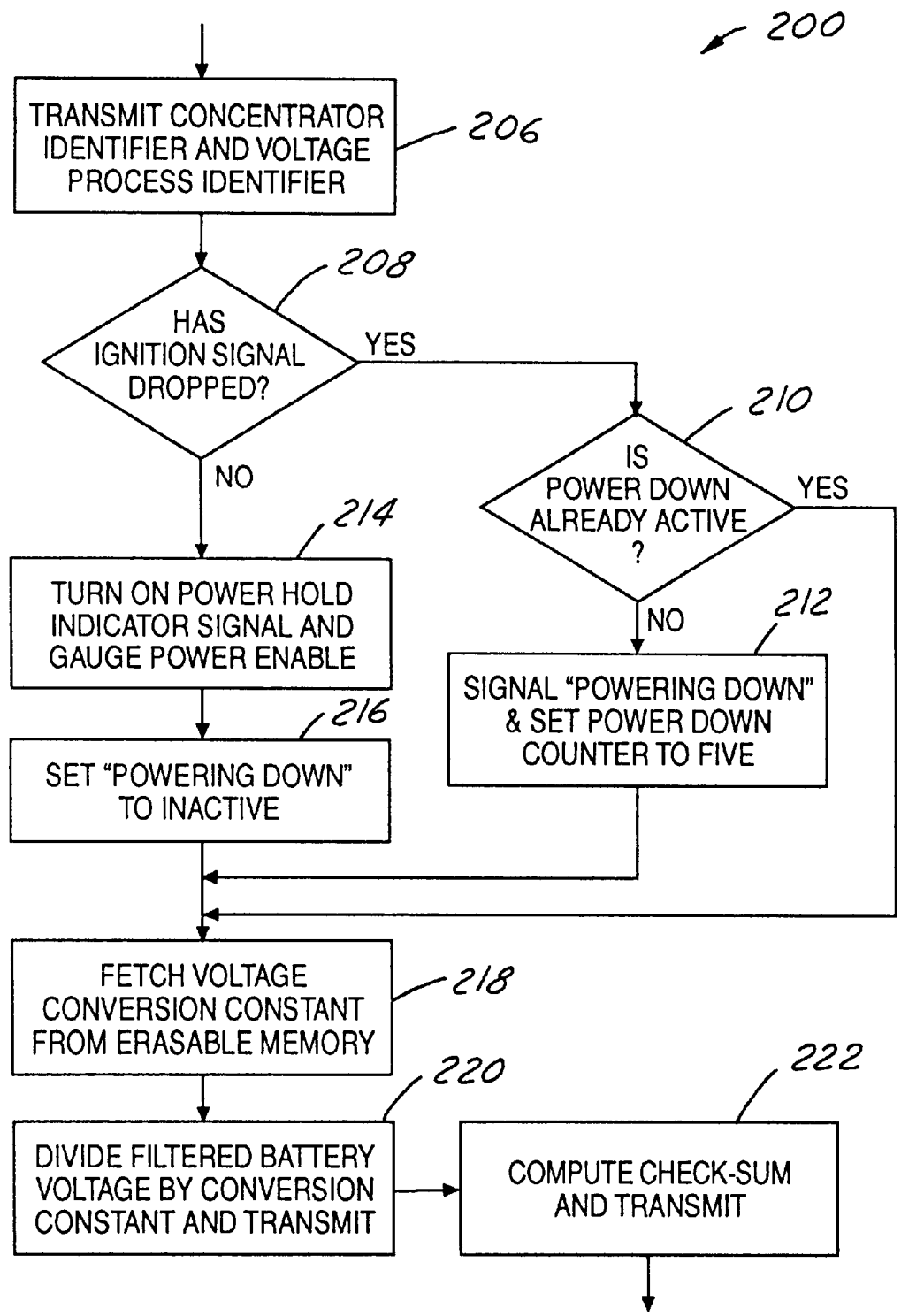
FIG. 19 is a flow chart showing conversion and transmission of a battery voltage input signal.

Turning now to FIG. 19, a flow chart showing the conversion and transmission of a battery voltage level as denoted in step 200 begins in step 206 by transmitting the identifier of the concentrator sending the message, followed by the process identifier associated with scaled battery 545. Next the value of scaled battery 545 is evaluated to determine whether ignition signal 58 has dropped 208. If ignition has dropped, then a check is made to determine whether the system has already acknowledged the loss of ignition and is in the power down operating mode 210. If the system is not presently powering down, then the system puts itself into the power down mode and sets the power down time counter for the requisite amount of power down time necessary 212, which is five seconds in a preferred embodiment.

If the ignition signal has not dropped 208 then in step 214 the system turns on the power hold indicator signal 18 and the gauge power enable 17 which operate to maintain system power as detailed in FIG. 5. Continuing with FIG. 19, the power down mode status is set to inactive 216.

Once power down status has been assessed, voltage conversion constant 638 is fetched from erasable memory 60 as denoted in step 218. The filtered battery voltage which was generated by the filtering process detailed in FIG. 12 is divided by voltage conversion constant 638 and transmitted 220. Finally, a checksum is computed and transmitted 222 in a fashion similar to that described in step 232 of FIG. 15.

Figure 20:
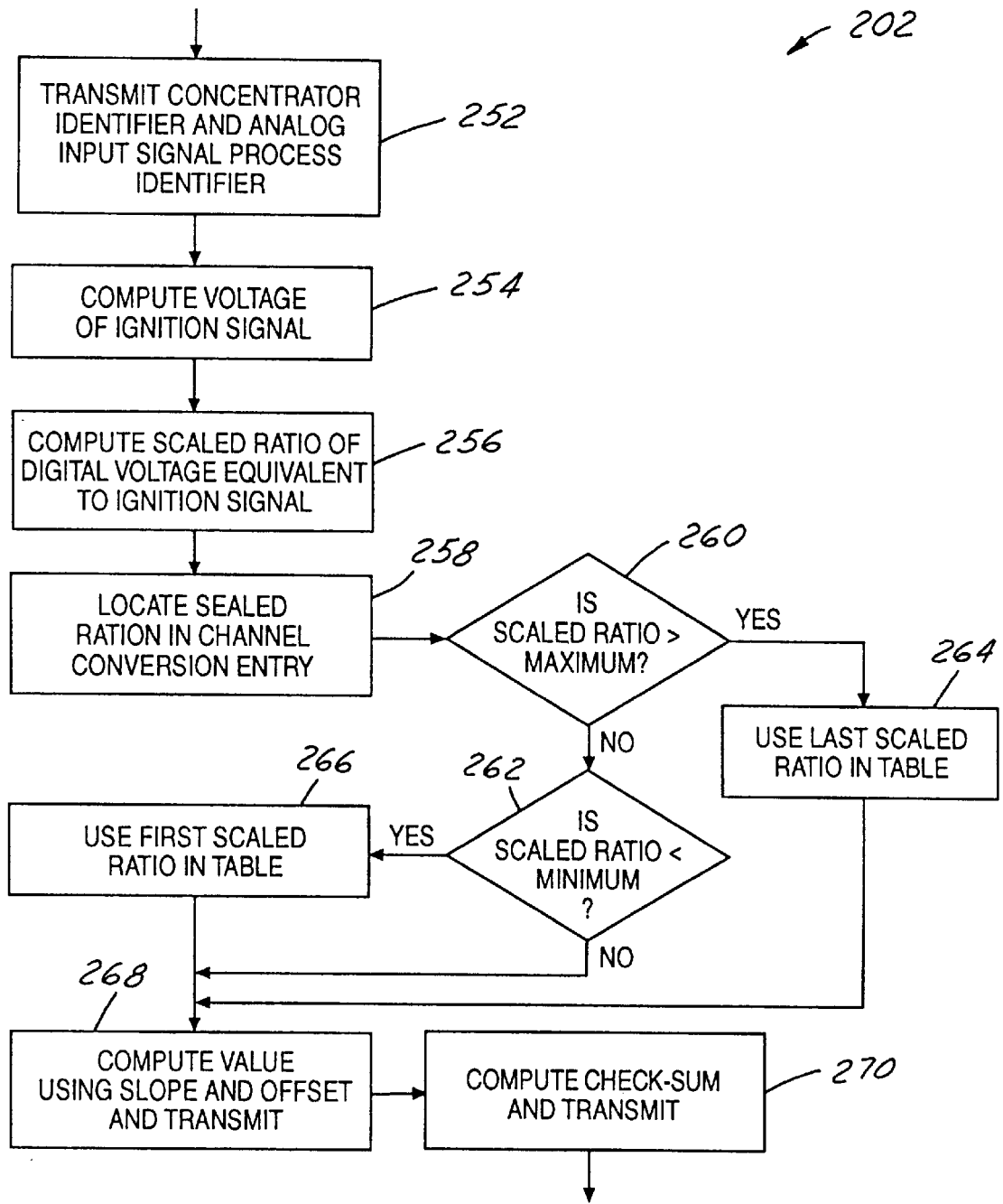
FIG. 20 is a flow chart showing the conversion and transmission of an analog-type input signal.

Turning now to FIG. 20, a flow chart showing the conversion and transmission of an analog-type input signal as denoted in step 202 begins by transmitting the identifier of data concentrator 1 sending the message, followed by the process identifier associated with the specific analog-type input signal 252. Next, the voltage of ignition signal 58 as described in FIG. 5 is computed by means of the voltage divider created by seventeenth resistor 518 and eighteenth resistor 519 shown in FIG. 5 and scaled battery 545 voltage from analog-to-digital converter 20 as described in FIG. 19. As known to those skilled in the art, the equation of the voltage divider shown in FIG. 5 is:

$$(V_{ignition\ signal\ 58}) = (V_{scaled\ battery\ 545})\ (R_{seventeen\ 518} + R_{eighteen\ 519}) / (R_{seventeen\ 518})$$

where V is voltage and R is resistance. For the computation of step 254 in FIG. 20, scaled battery 545 is obtained directly via analog-to-digital converter 20, as discussed in FIG. 19, while values for seventeenth resistor 518 and eighteenth resistor 519 are fixed as discussed in FIG. 5.

Continuing with FIG. 20, the scaled ratio of the digital voltage equivalent 24 associated with this specific analog-type input signal divided by ignition signal 58 is next computed 256. Those skilled in the art will recognize that most resistive senders which generate analog voltage signals 22 are measured by means of a resistor divider where the quotient of the sender's analog voltage signal 22 divided by the voltage of ignition signal 58 (which is the voltage to which the resistor divider is pulled up) is equal to the quotient of the sender's unknown resistance over the sum of the sender's unknown resistance plus the known pull-up resistor. The equation is:

$$(V_{analog\ voltage\ signal\ from\ sender} / V_{ignition\ signal}) = (R_{sender,\ unknown} / (R_{sender,\ unknown} + R_{pull-up}))$$

where V is voltage and R is resistance. Thus by computing the scaled ratio of the two voltages 256, the unknown resistance ratio may be established. In the instant invention, the voltage of the numerator in the above equation may be obtained directly via the corresponding digital voltage equivalent 24 analog-to-digital converter 20, whereas the voltage in the denominator was computed in step 254.

Continuing with FIG. 20, this incoming scaled ratio is now looked up 258 in the corresponding channel conversion entry 610 from erasable memory 60 by comparing the incoming scaled ratio to those in channel conversion entry, starting with maximum scaled ratio 622 in step 260. If the incoming scaled ratio exceeds the maximum scaled ratio 622, then the last scaled ratio 616 in channel conversion entry 610 is used 264. If the incoming scaled ratio does not exceed the maximum scaled ratio 622, then it is compared against the smallest scaled ratio 616 in channel conversion entry 610 at step 262. If incoming scaled ratio is less than the smallest scaled ratio 616, then the smallest scaled ratio 616 is used 266. This process is described in FIG. 6.

Continuing with FIG. 20, now that a scaled ratio 616 from channel conversion entry 610 has been identified, the corresponding slope 618 and offset 620 are used to complete the conversion. Incoming scaled ratio is first multiplied by corresponding slope 618 and then added to or subtracted from corresponding offset 620 depending on the positive or negative status of channel conversion entry's 610 slope indicator 612. The resulting converted value is then transmitted 268. Finally, a checksum is computed and transmitted 270 as described in FIG. 15 at step 232.

Note that FIG. 20 outlines the routine procedure for conversion of any routine analog voltage signal 22. The present invention may include more than one such signal in any implementation, as discussed with FIGS. 1 and 6.

Turning now to FIG. 21, a flow chart of the pulse signal processing for a data concentrating apparatus begins by receiving an edge of filtered pulse signal 44 which causes an interrupt to microcontroller 10. The current time of the system timer is immediately saved as the stop time 272, or the time of the last pulse edge received. If this is the first pulse edge received after the pulse measuring system has been restarted 274, then the current time is saved as the starting time of the pulse train 276, and a flag is set to indicate that the first pulse edge has been received 278. If a starting pulse edge has already been received 274, then the pulse counter is incremented 280. Having processed the pulse edge, the system returns to whatever activity was interrupted 279. As noted in FIG. 15 at step 226, the total pulse time, which is the stop time minus the start time, is divided by the pulse counter, which yields the average time per pulse for the duration of the measurement.

Figure 22:
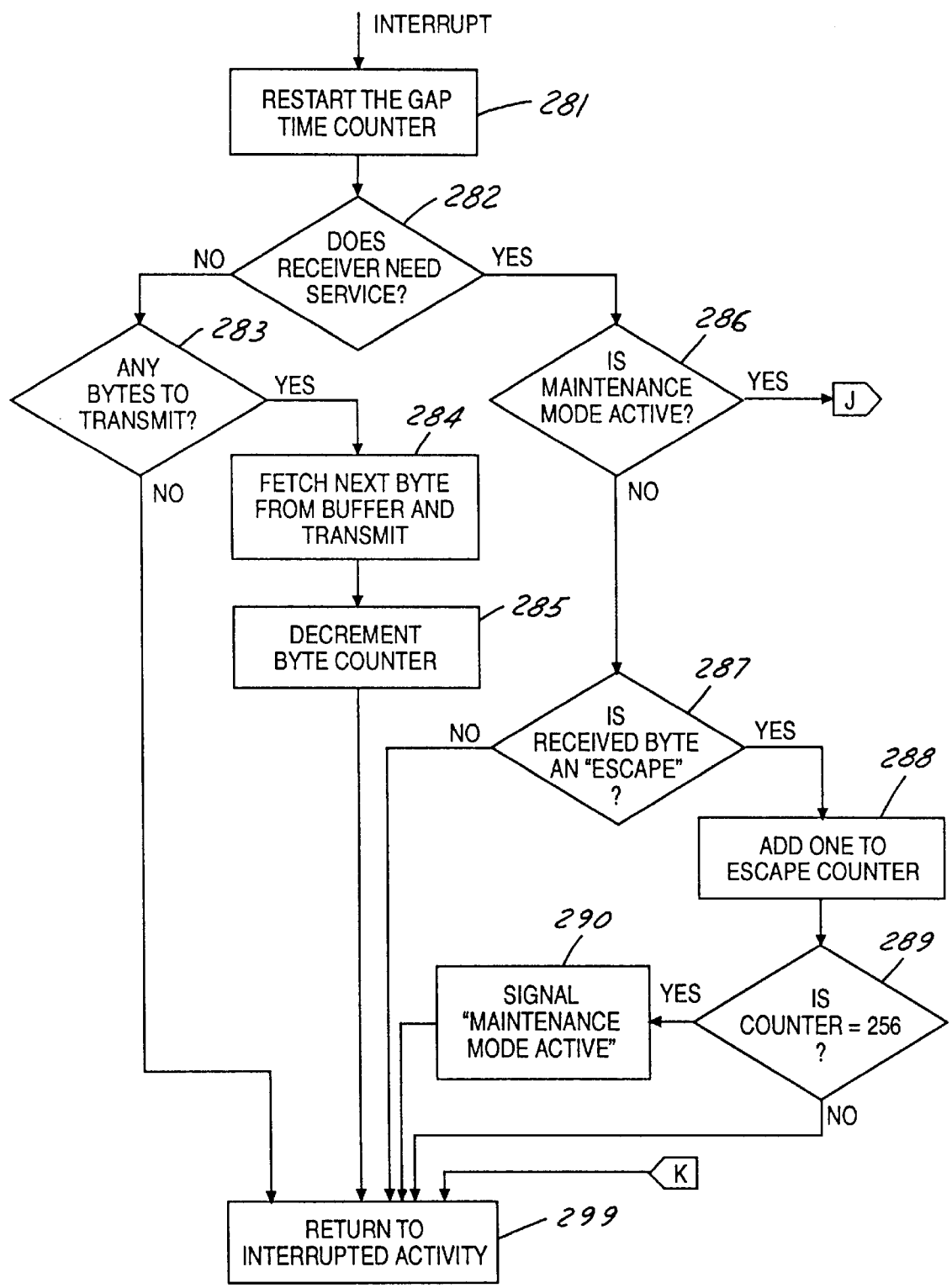
FIG. 22 is a flow chart of the serial processing for a data concentrating apparatus.

Turning now to FIG. 22, a flow chart of the serial processing for a data concentrating apparatus begins by UART 15 of microcontroller 10 being interrupted from its regular activity by a serial interrupt, which is caused by either transmitter output stream 72 or by receiver input stream 74, as shown in FIG. 1. Continuing with FIG. 22, interrupt processing begins by restarting the gap time counter 281, which is used to indicate whether a time gap has passed for purposes of enforcing the message protocol discussed with FIG. 13.

Continuing with FIG. 22, the reason for the interrupt is determined by checking to see whether the receiver has a new byte and thus needs servicing 282. If the receiver does not need servicing, then a check is made to see whether there are any bytes to be transmitted 283. If there are no bytes to transmit, then the system returns to the interrupted activity 299. Otherwise the next byte to be transmitted is fetched and sent out 284. The byte counter which tracks the number of bytes to be transmitted is decremented 285, and the system returns to the interrupted activity 299.

Continuing with FIG. 22, if the receiver does need service 282, then a check is made to see whether the system is presently in maintenance mode 286. If the system is in the maintenance mode, then execution continues with FIG. 23 as denoted by connector J. Continuing with FIG. 22, if the system is not in the maintenance mode, then the received byte is checked to see whether it is an ASCII ESCAPE character 287, which is the character used by a diagnostic or reprogramming device to take control of data concentrator 1. If the byte is not an ESCAPE character, then the system returns to the interrupted activity 299. If the byte is an ESCAPE character then one is added to the ESCAPE character counter 288 to indicate that another character has been received. This counter is then checked to see if the system has received two hundred and fifty-six ESCAPE characters 289. If it has not, then the system returns to the interrupted activity. If the system has received the requisite number of ESCAPE characters, then a flag is used to signal that maintenance mode is active 290, and the system returns to the interrupted activity 299. Those skilled in the art will recognize that the quantity of ESCAPE characters necessary to affect maintenance mode and the selection of the ASCII ESCAPE character are both arbitrary, and that alternative quantities and characters could be selected without departing from the spirit of the present invention. A preferred embodiment utilizes two hundred and fifty six characters because this quantity may be conveniently counted by a one-byte rollover counter.

Figure 23:
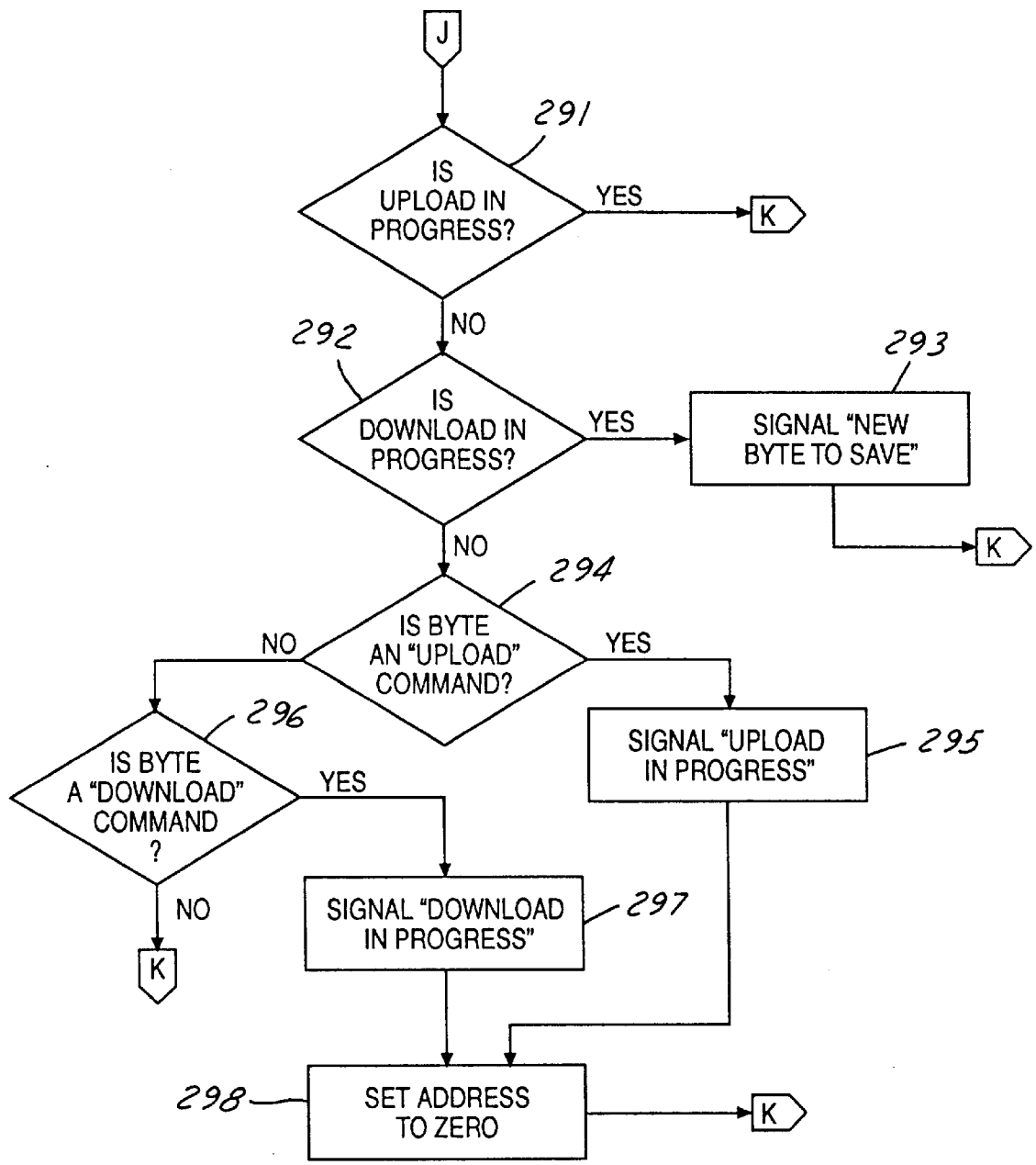
FIG. 23 is a first continuation sheet of the flow chart of FIG. 22.

Turning now to FIG. 23, a first continuation of the serial processing for a data concentrating apparatus details the serial interrupt activity associated with a system which is presently in the maintenance mode. First, a check is made to determine whether an upload of erasable memory 60 contents from data concentrator 1 to a diagnostic device is in progress 291. If it is, then operation continues with step 299 of FIG. 22, as denoted by connector K, and the system returns to the interrupted activity. Recall that the timing of the transmission of erasable memory contents is regulated by the 0.1 second timer as detailed in step 168 of FIG. 13.

Continuing with FIG. 23, if the system is not uploading data, then a check is made to determine whether a download was in progress 292 at the time of the interrupt. If a download was in progress, then a flag is set 293 to indicate that a byte has been received which is to be saved to erasable memory 60 and operation continues with step 299 of FIG. 22. Note that this signal will be detected at step 104 of FIG. 7 and the byte will be saved as detailed in step 110, also in FIG. 7.

Continuing with FIG. 23, if a download is not in progress then the received byte is checked to determine whether it represents a request to upload data from erasable memory 60 to a diagnostic device 294. If it is an upload request, then a flag is raised to signal that an upload is in progress 295 and the current memory address is set to zero 298, indicating the first memory byte. Operation then continues as denoted by connector K. If the received byte is not a request to upload data, then it is checked to see whether it is a request to download data to erasable memory 60 from a diagnostic device 296. If it is not a download request, then operation continues with connector K. Otherwise a flag is raised to signal that a download is in progress 297, and the current memory address is set to zero 298. Operation then continues as denoted by connector K.

From the foregoing description, one of ordinary skill in the art can easily ascertain the essential characteristics of this invention and, without departing from the spirit and scope of the claims, can make various changes and modifications to the invention to adapt it to various usages and conditions.

We claim:

1. In an engine-driven vehicle, an apparatus for generating a digital data stream comprising:

means for sensing a plurality of vehicle function and condition indicative signals and generating a plurality of corresponding digital equivalent signals, wherein a first one of said vehicle function and condition indicative signals is mechanical in nature and a second one of said vehicle function and condition indicative signals is electrical in nature;

mean for converting said digital equivalent signals into a plurality of corresponding digital messages; and, means for transmitting said plurality of digital messages on a data bus extending through said vehicle to thereby form said digital data stream.

2. The apparatus of claim 1 wherein said vehicle is adapted for water-based transportation, and said vehicle function and condition indicative signals comprise a pressure indicative of vehicle speed, and a signal having pulses indicative of engine speed.

3. The apparatus of claim 2 wherein said sensing means includes:

a pressure-to-voltage converter circuit having an input for receiving said pressure and an output for generating a pressure indicative signal having a voltage corresponding to the magnitude of said pressure; and, a filter circuit having an input terminal for receiving said signal having pulses and an output terminal for generating a filtered signal having pulses of a frequency corresponding to said engine speed.

4. The apparatus of claim 3 wherein said sensing mean further includes:

an analog-to-digital converter circuit having an input terminal for receiving preselected ones of said vehicle function and condition indicative signals, and an output terminal for generating corresponding ones of said plurality of a digital equivalent signals.

5. The apparatus of claim 4 wherein said converting means includes a control means responsive to said plurality of digital equivalent signals for generating said digital messages, said control means including predetermined program and data means in accordance with which said control means generates said digital messages.

6. The apparatus of claim 5 wherein said transmitting means includes a bus level converter circuit having an input terminal for receiving said digital messages, and an output terminal for generating said digital data stream comprising said digital messages.

7. The apparatus of claim 2 further comprising means for determining a speed of said vehicle, said determining means including:

means for measuring a pressure derived from velocity-to-pressure means associated with the vehicle;

means for determining a first speed component using the measured pressure in accordance with a square root function;

means for determining a second speed component using the measured pressure in accordance with a linear function;

means for calculating a vehicle speed as a linear function of said first speed component and said second component.

8. The apparatus of claim 7 wherein said calculating means includes means for evaluating the following relationship:

SPEED=((gain−(adjustment * multiplication factor))(X−zero pressure offset))$^{1/2}$−(trigger)/(X−transducer intercept)

where:
X=digital voltage equivalent associated with pressure voltage 34;
gain=predetermined gain value;
adjustment=predetermined adjustment value which is user-modifiable during operation;
multiplication factor=predetermined multiply value;
zero pressure offset=predetermined offset value;
trigger=predetermined trigger value; and,
transducer intercept=predetermined intercept value.

9. The apparatus of claim 7 wherein the vehicle includes a user-actuated input device, and wherein said first speed component determining means includes:
means for inputting a user-selected adjustment factor using the user-actuated input device;
means for calculating a product term using the adjustment factor and the measured pressure; and
means for determining the first speed component by evaluating the product term in accordance with the square root function.

10. The apparatus of claim 9 wherein said input device is a switch having a first position, a second position, and a repose position, and wherein said mean for inputting includes:
means for increasing the adjustment factor when the switch is in the first position.

11. The apparatus of claim 9 wherein said input device is a switch having a first position, a second position, and a repose position, and wherein said means for inputting includes:
means for decreasing the adjustment factor when the switch is in the second position.

12. The apparatus of claim 9 wherein said input device is a switch having a first position, a second position, and a repose position, and wherein said means for inputting includes:
means for maintaining the adjustment factor at a preexisting value when the switch is in the repose position.

13. The apparatus of claim 7 wherein said second speed component determining means includes means for dividing a pair of parameters.

14. The apparatus of claim 7 wherein said calculating means includes means for subtracting a pair of parameters.

15. The apparatus of claim 1 further comprising a regulator for regulating an input voltage on an input node to a predetermined output voltage on an output node wherein said regulator includes:
an input transistor connected between said input node and a feedback node for passing said input voltage to said feedback node, said input transistor having a control terminal for controlling conduction thereof;
a regulator coupled between said feedback node and said output node for generating said predetermined output voltage;
a zener diode having an anode and a cathode, said cathode being coupled through a first resistive network to said input node, said anode being connected through a second resistive network to a ground node;
a feedback resistive network coupled between said feedback node and said anode for impressing a predetermined voltage level at said anode during normal operation;
a disable circuit coupled to said control terminal of said input transistor and configured to place said input transistor in a nonconductive state when said input voltage exceeds a threshold voltage level;
wherein when said input voltage exceeds said predetermined threshold level, conduction in said zener diode is operative to activate said disable circuit to thereby place said input transistor in a nonconductive state, said input transistor remaining nonconductive until said input voltage drops substantially to said predetermined voltage level below said threshold voltage level.

16. The apparatus of claim 15 wherein said input transistor is a first PNP bipolar junction transistor having an emitter terminal connected to said input node, a collector terminal connected to said feedback node, and wherein said control terminal comprises a base terminal of said first PNP transistor.

17. The apparatus of claim 16 wherein said first resistive network includes first and second resistors connected in-series at a common node between said cathode and said input node, and wherein said disable circuit comprises:
a second PNP bipolar junction transistor having an emitter terminal coupled to said input node, a base terminal connected to said common node, and a collector terminal connected to said ground node through a third resistor;
a first NPN bipolar transistor having a base terminal connected to said collector terminal of said second PNP transistor through a fourth resistor, an emitter terminal connected to said ground node, and a collector terminal;
a second NPN bipolar transistor having a base terminal connected to said collector terminal of said second NPN bipolar transistor, an emitter terminal connected to said ground node, and a collector terminal connected to said base terminal of said first PNP transistor through a fifth resistor.

18. The apparatus of claim 1 further including a reverse voltage protection circuit for protection against application of reverse polarity power on an input node comprising:
a diode having an anode connected to a ground node and a cathode connected to said input node; and,
a polyswitch having a first terminal connected to a power source, and a second terminal connected to said input node, said polyswitch providing an electrically conductive path for electrical current below a predetermined threshold level;
wherein when said power source is of positive polarity, said polyswitch passes current by way of said input node;
wherein when said power source is of negative polarity, an electrical current flows from said ground node through said diode and said polyswitch to said power source until said threshold level is reached thereby opening said electrically conductive path.

19. A apparatus of claim 1 further comprising means for determining a rotational speed of a rotating component of the engine of the engine-driven vehicle, said rotational speed determining means comprising:

means for generating a pulse signal having pulses corresponding to the rotation of the rotating component;

means for selecting a sampling time interval;

means for counting the number of pulses in said pulse signal during said sampling time interval;

means for determining an average time interval per pulse using said counted number of pulses said sampling time interval; and, means for calculating said rotational speed of the rotating component of the engine over said sampling time interval using said average time interval per pulse.

20. The apparatus of claim 19 wherein said rotational speed calculating means comprises:

means for defining a pulse conversion constant corresponding to the number of pulses per complete rotation of the rotating component of the engine; and, means for determining the product of the pulse conversion constant and the average time interval per pulse.

* * * * *